United States Patent
Walker et al.

(10) Patent No.: US 12,524,492 B1
(45) Date of Patent: Jan. 13, 2026

(54) DOMAIN IDENTIFICATION FOR EMAIL CONTENT

(71) Applicant: Route App, Inc., Lehi, UT (US)

(72) Inventors: Evan Walker, Lehi, UT (US); Mark James Miller, Farmington, UT (US)

(73) Assignee: Route App, Inc., Lehi, UT (US)

( * ) Notice: Subject to any disclaimer, the term of this patent is extended or adjusted under 35 U.S.C. 154(b) by 45 days.

(21) Appl. No.: 18/112,662

(22) Filed: Feb. 22, 2023

Related U.S. Application Data

(60) Provisional application No. 63/313,185, filed on Feb. 23, 2022.

(51) Int. Cl.
  *G06F 16/955* (2019.01)
  *G06F 16/951* (2019.01)
  *G06F 16/9535* (2019.01)
  *G06Q 10/0833* (2023.01)

(52) U.S. Cl.
  CPC ........ *G06F 16/9566* (2019.01); *G06F 16/951* (2019.01); *G06F 16/9535* (2019.01); *G06Q 10/0833* (2013.01)

(58) Field of Classification Search
  CPC .............. G06F 16/9566; G06F 16/951; G06F 16/9535; G06Q 10/0833
  USPC ........................................................ 707/710
  See application file for complete search history.

(56) References Cited

U.S. PATENT DOCUMENTS

| | | | |
|---|---|---|---|
| 9,356,928 B2* | 5/2016 | Sowatskey | H04L 63/0823 |
| 10,027,702 B1* | 7/2018 | Oliver | H04L 63/1483 |
| 11,010,430 B1* | 5/2021 | Tupakula | G06F 16/9035 |
| 11,082,429 B2* | 8/2021 | Singh | H04L 63/0245 |
| 2006/0168066 A1* | 7/2006 | Helsper | H04L 63/1466 |
| | | | 709/206 |
| 2010/0293063 A1* | 11/2010 | Atherton | G06Q 30/02 |
| | | | 705/14.73 |
| 2014/0181216 A1* | 6/2014 | Liebmann | H04L 51/08 |
| | | | 709/206 |
| 2015/0134431 A1* | 5/2015 | Georgoff | G06Q 30/0207 |
| | | | 705/14.13 |
| 2015/0170202 A1* | 6/2015 | Frisco | G06Q 30/0281 |
| | | | 705/14.51 |
| 2018/0316571 A1* | 11/2018 | Andrade | G06Q 10/101 |
| 2018/0332076 A1* | 11/2018 | Callahan | H04L 67/563 |
| 2021/0090126 A1* | 3/2021 | Schobeiri | G06Q 30/0269 |

* cited by examiner

*Primary Examiner* — Kuen S Lu
(74) *Attorney, Agent, or Firm* — Austin Rapp

(57) ABSTRACT

A computing device is described. The computing device includes a processor, a memory, and instructions stored in the memory. When executed, the instructions cause the processor to collect a set of uniform resource locators (URLs) from an email. When executed, the instructions further cause the processor to navigate to a final destination URL for each URL of the set of URLs to determine a set of final destination URLs. When executed, the instructions also cause the processor to identify a single publisher domain based on the set of final destination URLs.

13 Claims, 9 Drawing Sheets

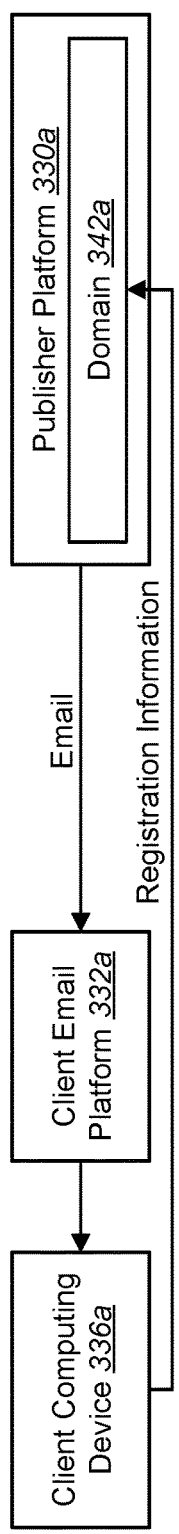
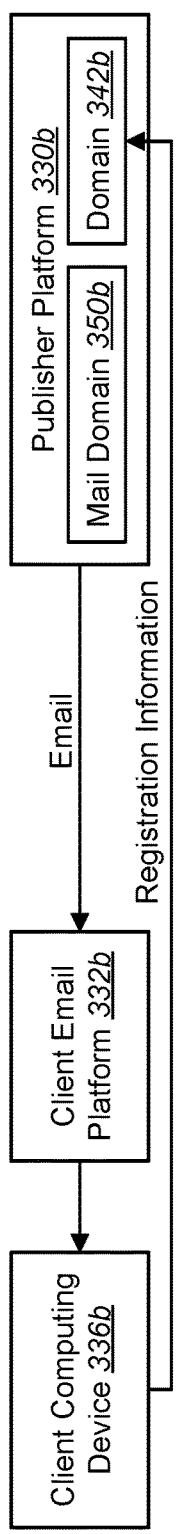
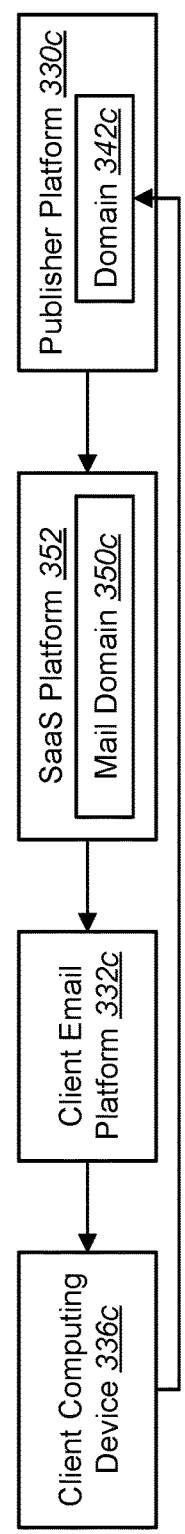
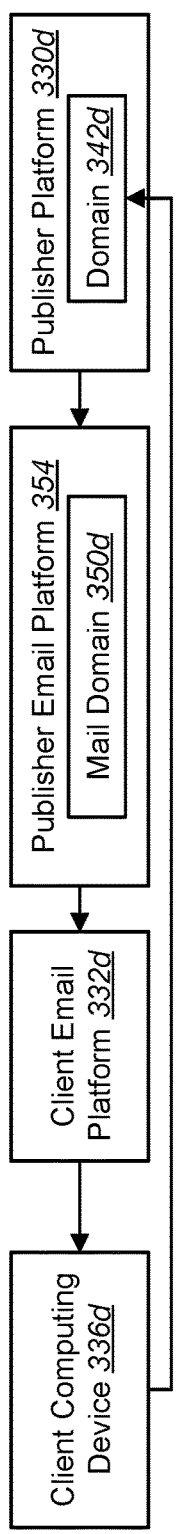

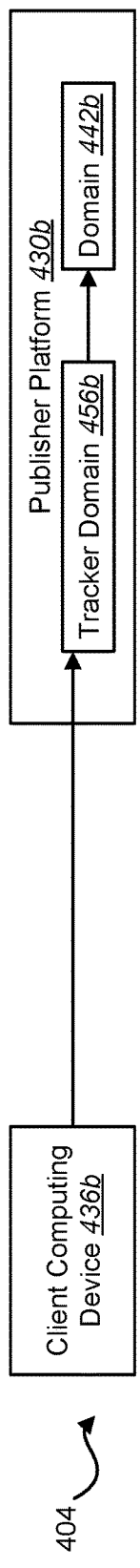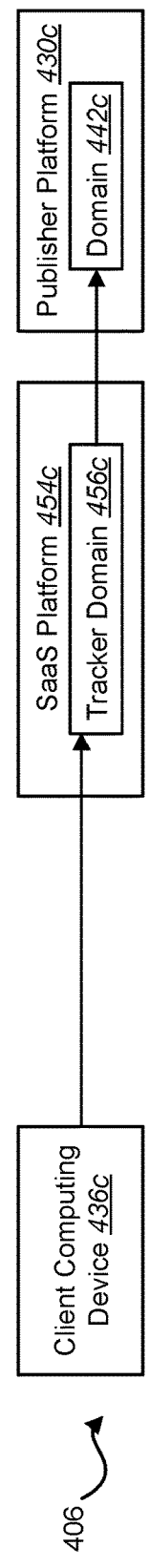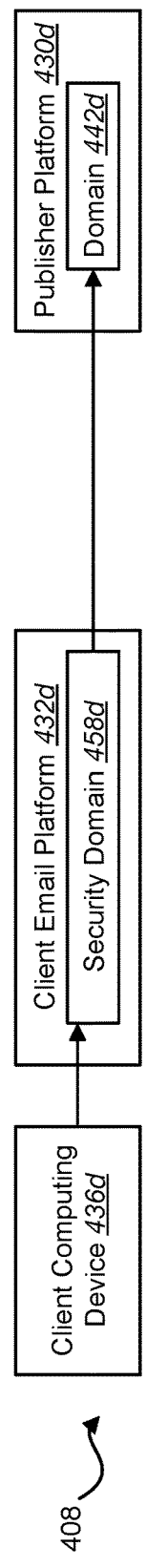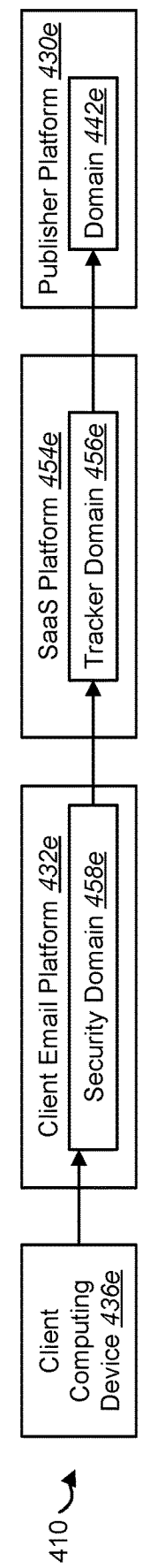

DOMAIN IDENTIFICATION FOR EMAIL CONTENT

RELATED APPLICATION

This application is related to and claims priority to U.S. Provisional Patent Application Ser. No. 63/313,185, filed Feb. 23, 2022, entitled "PUBLISHER DOMAIN INDUCTION FOR AUTOMATED EMAIL CONTENT," which is incorporated by reference herein.

TECHNICAL FIELD

The present disclosure generally relates to computers and computer-related technology. More specifically, the present disclosure relates to domain identification for email content.

BACKGROUND

Computing technologies and applications continue to advance at a rapid pace. Examples of computing devices may include a range of devices from mobile hand-held computing devices to large multi-processor computer systems. Computing devices are increasingly linked with other devices, such as servers, through networks.

In some examples, computing devices may be used for work, entertainment, and/or commerce. For example, a computing device may be utilized to write a paper, access the Internet, stream entertainment, and/or play an online game.

BRIEF DESCRIPTION OF THE DRAWINGS

FIG. 3A is a block diagram illustrating a first-party publisher example;

FIG. 3B is a block diagram illustrating another first-party publisher example;

FIG. 3C is a block diagram illustrating a third-party originator example;

FIG. 3D is a block diagram illustrating another third-party originator example;

FIG. 4A illustrates an example of navigating to a domain of a publisher platform;

FIG. 4B illustrates an example of navigating to a domain of a publisher platform via a tracker domain of the publisher platform;

FIG. 4C illustrates an example of navigating to a domain of a publisher platform via a tracker 456c of an SaaS platform;

FIG. 4D illustrates an example of navigating to a domain of a publisher platform via a security domain of a client email platform;

FIG. 4E illustrates an example of navigating to a domain of a publisher platform via a security domain of a client email platform and a tracker domain of an SaaS platform;

DETAILED DESCRIPTION

Figure 1:
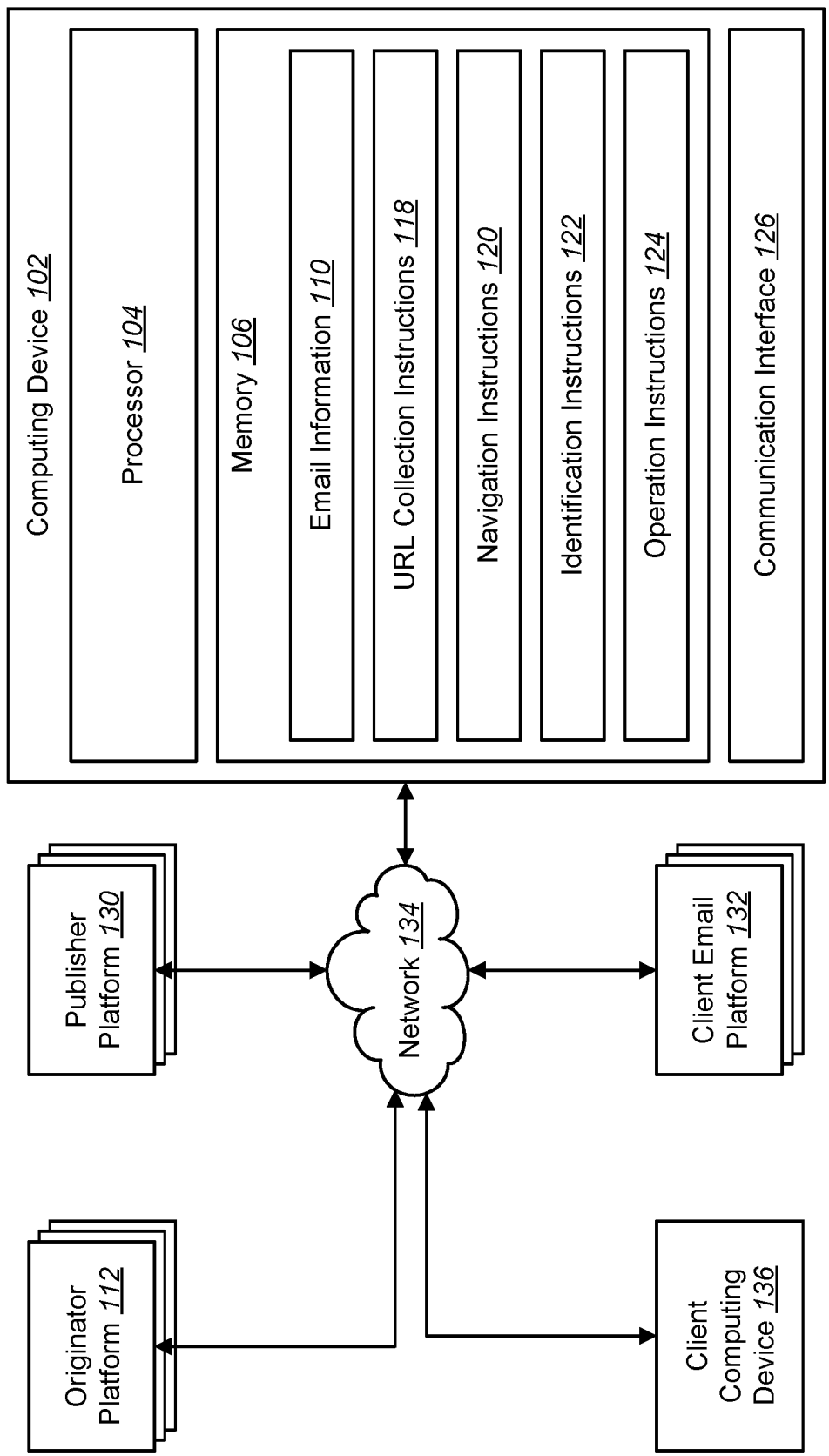
FIG. 1 is a block diagram of an example of a computing device that may identify a domain based on email content.

A computing device is described. The computing device includes a processor, a memory, and instructions stored in the memory. When executed, the instructions cause the processor to collect a set of uniform resource locators (URLs) from an email. When executed, the instructions further cause the processor to navigate to a final destination URL for each URL of the set of URLs to determine a set of final destination URLs. When executed, the instructions also cause the processor to identify a single publisher domain based on the set of final destination URLs.

In some examples, the instructions, when executed, cause the processor to discard a URL that includes a prohibited domain name to produce the set of URLs. The prohibited domain name may indicate an email service provider domain, a shipping provider domain, or a social media domain.

In yet further examples, the instructions, when executed, cause the processor to determine whether an originator domain name of the email matches an entry of a publisher index, and collect the set of URLs in response to a determination that the originator domain name of the email does not match an entry of the publisher index.

The instructions may also, when executed, cause the processor to follow one or more redirects of a first URL of the set of URLs to navigate to a first final destination URL corresponding to the first URL. The one or more redirects may include a redirect from an activity tracking platform domain, from a software as a service (SaaS) platform domain, or from a security platform domain.

In some examples, the instructions, when executed, cause the processor to count final destination domains of the set of final destination URLs. The instructions may also, when executed, cause the processor to determine a final destination domain with a greatest count as the single publisher domain.

The instructions may further, when executed, cause the processor to determine a merchant logo based on the single publisher domain, and generate a shipment tracking page based on the merchant logo.

The computing device may also include a communication interface configured to send the shipment tracking page to a client computing device.

A method is also described. The method includes collecting, by a processor, a set of uniform resource locators (URLs) from an email. The method further includes navigating, by the processor, to a final destination URL for each URL of the set of URLs to determine a set of final destination URLs, and identifying, by the processor, a single publisher domain based on the set of final destination URLs.

In some examples, the method may include discarding a URL that includes a prohibited domain to produce the set of URLs.

The method may also include determining whether an originator domain name of the email matches an entry of a publisher index, and collecting the set of URLs in response to a determination that the originator domain name of the email does not match an entry of the publisher index.

In still yet further examples, the method includes following one or more redirects of a first URL of the set of URLs to navigate to a first final destination URL corresponding to the first URL. The method may also include counting final destination domains of the set of final destination URLs and determining a final destination domain with a greatest count as the single publisher domain.

A non-transitory tangible computer-readable medium comprising instructions is also described. The instructions, when executed, cause a processor to collect a set of uniform resource locators (URLs) from an email, navigate to a final destination URL for each URL of the set of URLs to determine a set of final destination URLs, and identify a single publisher domain based on the set of final destination URLs.

Some examples of the systems and methods described herein relate to domain identification. A domain is a computing device or a group of associated (e.g., networked) computing devices referenced by a domain name. As used herein, the term "domain" may refer to one or more computing devices (e.g., a platform) and/or to a domain name referencing one or more computing devices. In some examples, a domain name (e.g., "examplewebdomain") may be utilized in a Uniform Resource Locator (URL) (e.g., "http://www.examplewebdomain.com") and/or in an email address (e.g., "identifier@examplewebdomain.com"). A domain name may be utilized to communicate over one or more networks with one or more computing devices. For instance, a client computing device may utilize a domain name with a browser application to request a webpage from a domain over the Internet.

A URL is a set of characters referring to a web resource. For instance, a URL (e.g., "http://www.examplewebdomain.com/examplefile.html") may indicate a protocol (e.g., http), host name (e.g., www), domain name (e.g., examplewebdomain), top-level domain (e.g., com), and/or a file name (e.g., examplefile.html). Some examples of protocols that may be indicated in a URL include Hypertext Transfer Protocol (HTTP). Hypertext Transfer Protocol Secure (HTTPS), File Transfer Protocol (FTP), database access protocol, and/or mail protocol (e.g., mailto), etc. A computing device may utilize a URL to request a web resource (e.g., webpage, file, and/or other resource, among other examples). In some examples, a URL may be utilized by a Domain Name System (DNS) server to look up an Internet Protocol (IP) address corresponding to the URL (e.g., domain name).

Some email protocols may indicate a domain name of an originator platform. For instance, a "from" field, a "sender" field, and/or a "reply-to" field of an email may indicate a domain name of an originator platform. An originator platform is an entity (e.g., one or more computing devices) that may send an email. For example, a domain name of an originator platform may be the domain name of the mail domain (e.g., mail server) that sent the email.

As used herein, a publisher platform is an entity that creates content for communication via email. Examples of a publisher platform may include an online merchant platform, e-commerce platform, service platform, and/or informational platform, among other examples. In some cases, a publisher platform may directly send an email. For instance, a publisher platform may be an originator platform and/or may include an originator platform, where the domain name of the publisher platform is the domain name of the originator platform.

In some cases, the domain name of a publisher platform may be different from the domain name of the originator platform. For instance, an originator platform may send an email for (e.g., on behalf of) a publisher. In some examples, a publisher platform may send content (e.g., text, images, and/or formatting, among other examples) to an originator platform, where the originator platform may produce an email based on the content and may send the email to a client computing device. Accordingly, the domain name of the originator platform may or may not match the domain name of the publisher platform. For example, a client computing device may have registered an email account address with a publisher platform. Email correspondence initiated by the publisher platform may originate from an originator platform (e.g., one or more sources and/or proxies) for which the domain name indicated in the "from," "sender," and/or "reply-to" fields of an email does not match the publisher domain name.

An unmatching domain name may cause issues in automated email analysis, data mapping (e.g., retrieving data from a publisher platform and/or selecting data corresponding to a publisher platform), and/or cyber security, among other examples. For instance, it may be difficult to automatically determine a publishing platform that initiated an email communication based on the "from," "sender," and/or "reply-to" fields of an email. In some examples, a service provider platform may be hindered in retrieving and/or providing additional information based on a publisher platform that initiated the email communication. In some examples, an originator platform domain name may be utilized to deceive a user regarding a party that initiated the email communication, which could result in a client computing device interacting with an untrusted publisher platform.

Accordingly, relying only on the email originator for automated determination of the publisher's domain may be ambiguous without manual review. Some examples of the techniques described herein may automatically identify a publisher domain based on information in the email (e.g., one or more URLs in the body of the email). For example, URLs may be collected from an email, the URLs may be followed to final destination URLs (via one or more redirects, for instance), and the final destination URLs may be utilized to identify the publisher domain. Automatically identifying the publisher domain may improve automated email analysis, may allow determining other data based on the publisher domain, and/or may improve cyber security.

Various examples of the systems and methods are now described with reference to the Figures. The examples of the present systems and methods, as generally described and illustrated in the Figures herein, could be arranged and designed in a wide variety of different configurations. Thus, the following more detailed description of several examples, as represented in the Figures, is not intended to limit the scope of the systems and methods, as claimed, but is merely representative of the various configurations of the systems and methods.

FIG. 1 is a block diagram of an example of a computing device 102 that may identify a domain (e.g., domain name) based on email content. A computing device is an electronic device that includes a processor and/or logic circuitry. Examples of a computing device may include a server (e.g., a web server, a set of servers, blade server(s), server bank, etc.), a desktop computer(s), a laptop computer(s), a tablet device(s), and/or a smartphone(s), etc. For instance, the computing device 102 may include one or more servers and/or desktop computers, etc. The computing device 102 may include a processor 104, a memory 106, and/or a communication interface 126. The computing device 102 may include additional components (not shown) and/or some of the components described herein may be removed and/or modified without departing from the scope of this disclosure.

In some examples, the computing device 102 may provide (and/or may be included in) a service provider platform. As used herein, a "platform" is a computing device (e.g., computing hardware and instructions) that provides computational functionality. For example, a service provider platform may include the computing device(s) 102, which may be configured to provide one or more services (e.g., publisher domain identification, cyber security, order tracking, package tracking, product recommendations, order history, shipping insurance processing, and/or other functionality). In some examples, the service provider platform may exclude one or more other devices (e.g., may exclude the publisher platform(s) 130, the originator platform(s) 112, the client email platform(s) 132, and/or the client computing device(s) 136).

The processor 104 may be a central processing unit (CPU), logic circuitry, a semiconductor-based microprocessor, a digital signal processor (DSP), graphics processing unit (GPU), field-programmable gate array (FPGA), an application-specific integrated circuit (ASIC), and/or other hardware device suitable for retrieval and execution of instructions stored in the memory 106. The processor 104 may fetch, decode, and/or execute instructions stored in the memory 106. In some examples, the processor 104 may perform one, some, or all of the operations, aspects, etc., described in relation to one or more of FIG. 1-6C. For example, the memory 106 may store instructions for one or more of the operations, aspects, etc., described in relation to one or more of FIGS. 1-6C. The processor 104 may be coupled to (e.g., may be in electronic communication with) the memory 106. In some examples, one or more of the operations, functions, aspects, etc., described herein in terms of instructions executed on a processor may instead be implemented directly in hardware without instructions. For instance, the processor 104 may be a state machine, logic circuitry, ASIC, etc., implemented without instructions to perform one or more of the operations, functions, aspects, etc., described herein.

The memory 106 may be an electronic, magnetic, optical, and/or other physical storage device that contains or stores electronic data (e.g., instructions and/or information). In some examples, memory (e.g., memory 106) may be Random Access Memory (RAM), magnetoresistive random-access memory (MRAM), Dynamic Random Access Memory (DRAM), phase change RAM (PCRAM), memristor, non-volatile memory, Read-Only Memory (ROM), Erasable Programmable Read-Only Memory (EPROM), Electrically Erasable Programmable Read-Only Memory (EEPROM), and/or flash memory, etc. The memory 106 may be, for example, RAM, EEPROM, a storage device, a solid-state drive (SSD), a magnetic drive, an optical disc, and/or the like. In some examples, the memory 106 may be volatile and/or non-volatile memory, such as DRAM, EEPROM, MRAM, PCRAM, memristor, flash memory, and/or the like. In some examples, the memory 106 may be a non-transitory tangible machine-readable storage medium. In some examples, the memory 106 may include multiple devices. In some examples, the memory 106 of the client computing device 136 may store email information 110, URL collection instructions 118, navigation instructions 120, identification instructions 122, and/or operation instructions 124.

In some examples, the computing device 102 may include hardware (e.g., circuitry, ports, connectors, antennas, etc.) and/or machine-readable instructions to enable the processor 104 to communicate with various input and/or output devices, such as a keyboard, a mouse, a display, another apparatus, electronic device, computing device, etc., through which a user may input instructions and/or information into the computing device 102.

In some examples, the computing device 102 may include a communication interface 126 through which the computing device 102 (e.g., processor 104) may communicate with an external device or devices. The communication interface 126 may include hardware (e.g., a network interface card) and/or machine-readable instructions to enable the processor 104 to communicate with one or more external devices (e.g., the client computing device 136, publisher platform(s) 130, originator platform(s) 112, client email platform(s) 132, another platform(s), and/or another device(s)). For instance, the communication interface 126 may include a wired communication interface(s) and/or wireless communication interface(s) for linking to an electronic device(s) (e.g., switch(es), router(s), server(s), and/or computer(s), etc.). Examples of a wired communication interface may include an Ethernet interface, Universal Serial Bus (USB) interface, fiber interface, Lightning interface, etc. In some examples, the computing device 102 may include a wireless communication interface to send and/or receive wireless (e.g., radio frequency (RF)) signals. Examples of wireless communication interfaces may include an Institute of Electrical and Electronics Engineers (IEEE®) 802.11 (WI-FI®) interface, Bluetooth® interface, cellular (e.g., 3G, Long-Term Evolution (LTE®), 4G, 5G, etc.) interface, etc.

In some examples, the computing device 102 may be in communication with (e.g., have a communication link with) the client computing device(s) 136, publisher platform(s) 130, originator platform(s) 112, client email platform(s) 132, another platform(s), and/or another device(s) via a network 134. Examples of the network 134 may include a local area network (LAN), wide area network (WAN), the Internet, cellular network, Long Term Evolution (LTE) network, 5G network, and/or a combination thereof, etc. For instance, the network 134 may include one or more LANs, WANs, cellular networks, and/or the Internet, etc. In some examples, the computing device 102 (e.g., processor 104) may utilize the communication interface 126 to send and/or receive information.

In some examples, the client computing device 136 may communicate with the publisher platform 130. For instance, the client computing device 136 may register an email address, receive information, place an order, purchase a product, request shipping, and/or request tracking, among other examples. In some examples, the publisher platform 130 may store a record of the communication (e.g., may register an email address and/or may record a transaction, among other examples). In some examples, the publisher platform 130 may be a computing device (e.g., server(s)) associated with a vendor(s).

The publisher platform 130 may initiate sending an email to a client email platform 132. For example, the publisher platform 130 may send content (e.g., text, image(s), and/or URL(s), among other examples) to one or more originator platforms 112. In some examples, the content may include order information, shipping information, delivery information, order confirmation information, shipping confirmation information, shipment tracking update information, product information, advertising information, delivery confirmation information, academic information, news, an article, media information, and/or entertainment information, among other examples. The originator platform 112 may generate an email based on the content. In some examples, the content may be formatted as text, one or more files, one or more links, one or more emails, etc., targeted to one or more email addresses indicated by the publisher platform 130. The originator platform 112 may generate an email including an originator field (e.g., "from," "sender," and/or "reply-to" field) indicating a domain name of the originator platform 112. The originator platform 112 may generate a body of the email based on the content from the publisher platform 130. For instance, the originator platform 112 may include, in the body of the email, some or all of the original content (e.g., the text, image(s), and/or URL(s)) provided by the publisher platform 130. Examples of the originator platform 112 may include a mail server, Software-as-a-Service (SaaS) platform, publisher email service provider platform, and/or activity tracking platform, among other examples. Examples of originator platforms and/or originator domains are provided in relation to FIGS. 3-4.

The originator platform 112 may send the email to one or more client email platforms 132. Examples of a client email platform 132 may include a consumer email service provider platform. For instance, the client email platform 132 may be an email server(s) for Gmail®, Yahoo! Mail®, Outlook™, etc. The client computing device 136 may access, receive, and/or retrieve the email from the client email platform 132.

In some examples, the email may include one or more URLs (e.g., links). In some examples, a URL in the email, when followed, may direct the client computing device 136 to a publisher platform 130. For instance, the URL may direct the client computing device 136 to request a web page from the publisher platform 130. In some examples, a URL in the email, when followed, may direct the client computing device 136 to request a web page from a platform (e.g., shipment tracking platform, originator platform 112, and/or social media platform, among other examples) with a different domain name than the publisher domain name.

In some examples, a URL in the email, when followed, may direct the client computing device 136 to a platform with a different domain name than the publisher domain name, where the platform may redirect the client computing device 136 to the publisher platform 130. For instance, the URL may direct the client computing device 136 to the originator platform 112 and/or another platform (e.g., http server, SaaS platform, activity tracking platform, and/or security platform, among other examples), which may redirect the client computing device 136 to the publisher platform 130. A mail server may not be able to receive a request that is initiated via an HTTP url. While it is possible to configure a single computer server as the DNS target for multiple protocols, there would be a different service for each protocol and therefore the service handling the protocol request may not be considered the same as the mail server. The distinction between "servers" handling requests may be at the executable level rather than the virtual or physical computer level. From an external perspective, the method of routing for each protocol then becomes the network port used for communication. The URL specifies a port number (80 is used if not specified explicitly). The server receiving the request will have the executable process listening on a given network port and will be capable of handling the traffic sent to that port. In the case of the HTTP protocol request, the URL will point to the port and the HTTP server will handle it, while any mail will be sent to a different port and function similar to the HTTP protocol as described.

In some examples, the URL(s) in the email may be provided by the publisher platform 130 and/or by the originator platform 112. For instance, the originator platform 112 may add and/or format content of the email (e.g., the URL(s)). In some examples, the originator platform 112 may replace and/or format a first URL directed to the publisher platform 130 with a second URL directed to another platform (e.g., a link to an activity tracking platform, a link to a non-publisher platform, a link to the originator platform 112, and/or a link to a security platform, among other examples). For instance, the originator platform 112 may remove the first URL from the content provided by the publisher platform 130 and may insert the second URL, where the second URL links to a platform that may redirect to the first URL of the publisher platform 130. For example, the second URL may direct the client computing device 136 to navigate to the originator platform 112 or an activity tracking platform to log the activity and redirect the client computing device 136 to the publisher platform 130.

In some examples, a URL in the email may include an encoded parameter, token, and/or a secondary domain name (of the originator platform 112 and/or of the publisher platform 130). For instance, an encoded parameter may be a string of characters (e.g., text, number(s) and/or letter(s)) that may be decoded to produce a publisher domain name and/or a URL directed to the publisher platform 130. In a scenario, the client computing device 136 may follow a URL in the email to a platform (e.g., the originator platform 112), which may decode the encoded parameter to produce a URL directed to the publisher platform 130 and may redirect the client computing device 136 to the publisher platform 130 using the decoded URL. For instance, the encoded parameter may be decoded using a mathematical function, cryptographic function, etc. Including the URL with the encoded parameter may allow the originator platform 112 to track the activity of the client computing device 136 and/or may prevent the client computing device 136 from circumventing activity tracking while following the URL. For instance, the encoded parameter may correspond to an email address, which may allow the originator platform 112 to track activity (e.g., URL click(s)) corresponding to the email address.

A token may be a string of characters (e.g., text, number(s) and/or letter(s)) that may be utilized to look up a publisher domain name and/or a URL directed to the publisher platform 130. For instance, the originator platform 112 may index (e.g., store in a database) one or more URLs from the publisher platform 130 with one or more tokens. In a scenario, the client computing device 136 may follow a URL in the email to a platform (e.g., the originator platform 112), which may utilize the token to look up (from a lookup table and/or database, etc.) a URL directed to the publisher platform 130 and may redirect the client computing device 136 to the publisher platform 130 using the URL. Including the URL with the token may allow the originator platform 112 to track the activity of the client computing device 136 and/or may prevent the client computing device 136 from circumventing activity tracking while following the URL. For instance, the token may correspond to an email address, which may allow the originator platform 112 to track activity (e.g., URL click(s)) corresponding to the email address.

In some examples, a URL that initially directs to a non-publisher platform may include a secondary domain name (e.g., secondary URL) of the publisher platform 130. For instance, the client email platform 132 may scan the email to determine one or more URLs in the content. The client email platform 132 may generate a URL that directs to a security platform (not shown in FIG. 1), where the URL includes the secondary domain name of the publisher platform 130 and/or the secondary domain name of the originator platform 112. In some examples, the URL may have a format such as "securityplatformdomain.com/?url=examplewebdomain.com." where "securityplatformdomain" is the domain name of a security platform and "examplewebdomain" is a domain name of the originator platform 112 and/or publisher platform 130. The URL may direct the client computing device 136 to a security platform, which may determine whether the secondary domain name corresponds to a trusted domain. In a case that the secondary domain name corresponds to a trusted domain, the security platform may redirect the client computing device 136 using the secondary domain name. In a case that the secondary domain name corresponds to an untrusted and/or unknown domain, the security platform may block further navigation and/or may send a message to the client computing device 136 requesting whether to proceed to the untrusted or unknown domain.

In some examples, the client email platform 132 may provide email information 110 to the computing device 102. The email information 110 may include one or more emails and/or information from one or more emails. For instance, the email information 110 may include one or more emails, email content, one or more URLs, text, one or more images, email body information, email field information (e.g., email header information, "from" field, "sender" field, and/or "reply-to" field, among other examples), order information, purchase information, pre-order information, and/or shipping information such as shipping confirmation information, tracking information, and/or delivery information, among other examples. In some examples, the client computing device 136 (at the direction of a user, for instance) may authorize the computing device 102 to access (and/or receive information from) the client email platform 132. For instance, the client computing device 136 may provide (e.g., send) authorization and/or access information to the computing device 102 to access and/or parse the client email platform 132. In some examples, the client computing device 136 (at the direction of a user, for instance) may provide a username, password, and/or other authentication credential(s) to allow the computing device 102 to access the client email platform 132 (e.g., email server).

In some examples, the communication interface 126 may receive authorization to access a client email platform 132 (e.g., a user email account). The email information 110 may correspond to one or more emails initiated by the publisher platform 130. For instance, the computing device 102 may search the client email platform 132 for data potentially indicating an email(s) initiated by a publisher platform 130. In some examples, the computing device 102 may search the client email platform 132 (e.g., may search emails corresponding to a user account) for one or more emails of a commercial nature (e.g., one or more emails indicating a purchase, transaction, and/or shipping, among other examples). For instance, the computing device 102 may search the client email platform 132 for data (e.g., text, numbers, symbols, and/or images, etc.) indicating an order(s), shipment(s), shipment tracking data (e.g., tracking number(s) for a carrier(s)), and/or delivery data, etc. The computing device 102 may request and/or receive the email information 110 in accordance with the search and/or parsing. The email information 110 may indicate one or more transactions (e.g., purchases and/or orders) corresponding to a user account. A client email platform 132 may be a computing device (e.g., server(s)). In some examples, the client email platform 132 may be owned by a third party outside of a service provider network, operated by a third party outside of a service provider network, and/or may provide a service outside of a service provider network. For instance, the client email platform 132 may store a record(s) of a transaction(s) (e.g., product order(s), purchase(s), product(s) shipped, etc.) of a vendor that is outside of a service provider network.

In some examples, the client email platform 132 may be configured to send the email information 110 to the computing device 102. For instance, the client computing device 136 may configure the client email platform 132 to forward the email information 110 (e.g., email(s), URL(s) in an email(s), commercial email(s), and/or information from an email(s), among other examples). For instance, emails sent from a third-party vendor, from a package carrier(s), from a tracking service(s), etc., may be forwarded to the computing device 102 as the email information 110. In some examples, the computing device 102 may provide instructions (e.g., an email forwarding filter(s), agent program, add-on instructions, etc.) to the client computing device 136 to configure the client email platform 132 to send the email information 110 (e.g., selected email(s), URL(s) from email(s), and/or selected email content, among other examples). In some examples, the computing device 102 may not be authorized to access the client email platform 132 directly. For instance, the computing device 102 may not have authorization and/or authentication information (e.g., a credential(s), encryption certificate(s), etc.) to access the client email platform 132 (e.g., email server, short message service (SMS) server, etc.). In some examples, email information 110 may be associated with a user account, an email account, and/or the client computing device 136.

The processor 104 may execute the URL collection instructions 118 to collect one or more URLs (e.g., a set of URLs) from one or more emails. For instance, the computing device 102 (e.g., processor 104) may search and/or parse the client email platform 132 and/or the email information 110 to collect one or more URLs from one or more emails. In some examples, the processor 104 may search and/or parse email content by identifying a string (e.g., one or more strings likely corresponding to a URL such as "http:," "https:," "ftp:," "mailto:," "www.," ".com," ".net," ".org," and/or ".us," among other examples) likely indicating a URL. In some examples, the processor 104 may search and/or parse email content by identifying an element and/or tag (e.g., "href=") in the email (e.g., in hypertext markup language (html)-formatted email).

In some examples, the processor 104 may execute the URL collection instructions 118 to discard one or more URLs that includes a prohibited domain name to produce the set of URLs. For instance, the memory 106 may store one or more prohibited domain names. A prohibited domain name may indicate a non-target domain. In some examples, a prohibited domain name may indicate a domain that is outside of a target domain (e.g., merchant platform domains, entertainment platform domains, and/or academic platform domains, among other examples). For instance, a prohibited domain name may indicate a domain that is not targeted for identification. In some examples, publisher domains targeted for identification may include publisher domains corresponding to one or more merchant platforms. In some examples, a prohibited domain name indicates an email service provider domain, a shipping provider domain, and/or a social media domain, among other examples. For instance, when goods merchant platform domains are targeted for identification, one or more prohibited domain names may exclude email service provider domains (e.g., "gmail," "hotmail," "yahoo," and/or "outlook," among other examples), and/or shipping provider domains (e.g., "fedex," "ups," "dhl," and/or "tools.usps," among other examples), social media domains (e.g., "facebook," "instagram," "snapchat," and/or "youtube," among other examples). For instance, one or more publisher domains may be targeted for identification from one or more shipment tracking emails in some approaches. Accordingly, discarding one or more non-target domains may improve target domain identification accuracy.

The processor 104 may execute the navigation instructions 120 to navigate to a final destination URL for each URL in the one or more URLs (e.g., in the set of URLs). For instance, the computing device 102 (e.g., processor 104 and/or the communication interface 126) may follow each URL by sending one or more requests via the network 134. In some examples, the computing device 102 (e.g., the communication interface 126) may send one or more HTTP messages to request a web resource corresponding to the URL.

A final destination URL is a URL at which navigation ends. For instance, the computing device 102 may send a request for a URL in an email and may follow one or more redirects, if any, to navigation to a final destination URL. In some examples, a final destination URL is a URL at which no further redirect automatically occurs when following an initial URL. In some examples, an initial URL may be a final destination URL. In some examples, an initial URL is not a final destination URL when one or more redirects follow the initial URL. In some examples, the computing device 102 (e.g., processor 104 and/or communication interface 126) may navigate to a final destination URL for each URL in the set of URLs (of an email, for instance) to determine a set of final destination URLs. For instance, the set of final destination URLs may include all final destination URLs resulting from following the set of URLs in an email.

In some examples, the processor 104 may execute the navigation instructions 120 to follow one or more redirects of a URL of the set of URLs to navigation to a final destination URL corresponding to the URL. For instance, the one or more redirects may include a redirect from an activity tracking platform domain, from a SaaS platform domain, and/or from a security platform domain, among other examples.

In some examples, the processor 104 may execute the identification instructions 122 to identify a single publisher domain based on the one or more final destination URLs (e.g., the set of final destination URLs). For instance, the processor 104 identify a single publisher domain corresponding to a greatest quantity of final destination URLs in the set of final destination URLs.

In some examples, the processor 104 may execute the identification instructions 122 to count final destination domains (e.g., final destination domain names) of the set of final destination URLs. For instance, the processor 104 may determine a count for each unique final destination domain name in the set of final destination URLs. The processor 104 may execute the identification instructions 122 to determine a final destination domain with a greatest count as the single publisher domain.

In some examples, the processor 104 may produce a histogram of final destination domains. A "histogram," as used herein, is a data structure indicating one or more counts or frequencies of the occurrence of one or more respective items. For example, a histogram may indicate a count for each final destination domain (e.g., a number of instances of a domain name for each final destination domain name). The histogram may be stored in the memory 106. A histogram may or may not be expressed visually. The processor 104 may utilize the histogram to determine the final destination domain based on the histogram in some approaches. For instance, the processor 104 may determine the final destination domain with a greatest count in the histogram as the single publisher domain. In some examples, the processor 104 may iteratively compare each of the counts to determine a final destination domain with a greatest count. For instance, the processor 104 may compare counts to determine a greater of a first count and a second count, may compare the greater of the first count and the second count with a third count, and so on, to determine the final destination domain with the greatest count.

In a case where multiple (e.g., two) final destination domains have equal counts, the processor 104 may perform a tiebreaker procedure to select the single publisher domain. For instance, the processor 104 may search the body of the email to determine whether one domain name (or a portion thereof) of the final destination domains matches text in the body of the email. A final destination domain with a greatest number of matches with the text of the email may be selected as the single publisher domain.

In some examples, one or more of the procedures described herein may be performed in response to determining that an originator domain name of an email is unrecognized. An originator domain name is a domain name of an email sender (e.g., a domain name indicated in a "from," "sender," and/or "reply-to" field of an email). For instance, collecting a set of URLs, navigating to a set of final destination URLs, and/or identifying a single publisher domain based on the set of final destination URLs may be performed in response to determining that an originator domain name is unrecognized and/or does not correspond to a previously identified single publisher domain. In some examples, the memory 106 may store a publisher index (not shown in FIG. 1). The publisher index is a data structure (e.g., table, list, and/or array, among other examples) that maps one or more entries (e.g., one or more originator domain names) to one or more publisher domains (e.g., one or more publisher domain names). In some examples, the computing device 102 (e.g., processor 104) may determine whether an originator domain name of an email matches an entry of the publisher index. The computing device 102 (e.g., processor 104) may collect the set of URLs, navigate to the final destination URLs, and/or identify a single publisher domain in response to a determination that the originator domain name of the email does not match an entry of the publisher index. In some examples, the computing device 102 (e.g., processor 104) may build the publisher index by adding an originator domain name of an email as an entry with a corresponding identified single publisher domain. In some examples, one or more of the procedures described herein may only be performed for an initial email where an originator domain name is initially unrecognized.

In some examples, the computing device 102 (e.g., processor 104) may perform one or more operations based on the identified single publisher domain. For example, the computing device 102 may be a service provider platform to provide one or more services to the client computing device 136 based on the identified single publisher domain.

In some examples, the computing device 102 may receive and/or store order information (not shown in FIG. 1). The order information may be associated with an order placed from the client computing device 136 to the publisher platform 130. An order is a record of a transaction (e.g., purchase agreement, record of sale, and/or request for goods or services, among other examples). Order information is one or more pieces of information regarding an order. For instance, the order information may indicate one or more products purchased (e.g., Universal Product Code (UPC), identifier, item name, service name, and/or product image, among other examples), product price(s), one or more entities associated with the order (e.g., merchant identifier, customer name), contact information (e.g., customer email address), shipping information (e.g., carrier name, carrier identifier, order identifier (e.g., order number), tracking number, anticipated shipping date, and/or anticipated delivery date, among other examples), etc.

In some examples, one or more publisher platforms 130 and/or one or more client email platforms 132 may send order information to the computing device 102. For instance, one or more publisher platforms 130 may be included in a service provider network (not shown in FIG. 1). For example, a publisher platform 130 and the computing device 102 in the service provider network may coordinate to track orders (e.g., transactions, purchases, and/or packages, among other examples). In some examples, a device(s) associated with a vendor that is registered with (and/or that has a vendor account on) the service provider platform may be included in a service provider network. For instance, a vendor associated with the publisher platform 130 may be registered as a vendor of the service provider platform and/or may have an account on the service provider platform (e.g., order tracking platform, package tracking platform, package insurance platform, marketplace platform, and/or other service provider platform, etc.) provided by the computing device 102. In some examples, the computing device 102 may store identifying data (e.g., registration data, vendor account information, etc.) of a vendor(s) with an associated publisher platform(s) 130 in the service provider network.

In some examples, the computing device 102 may store product information (e.g., a product listing(s), product identifier(s), product code(s), UPC(s), product description(s), product price(s), product ordering link(s), product page(s), and/or product image(s), among other examples) for a vendor(s) with a publisher platform(s) 130 in the service provider network. For instance, the computing device 102 may receive catalog data associated with a vendor and/or may provide information about the product(s) of the vendor indicated by the catalog data.

In some examples, a service coordinated and/or provided by the computing device 102 (e.g., the service provider platform) may be auxiliary (e.g., ancillary, supplementary, etc.) to a transaction (e.g., purchase, shipping, etc.) provided by a vendor and/or provided by the publisher platform 130 associated with a vendor. For instance, a vendor transaction (e.g., purchase, shipping, etc.) may be carried out independently from a service (e.g., package tracking, package insurance, etc.) provided by the service provider platform.

In some examples, the computing device 102 may provide one or more services to the client computing device 136 associated with a user account. A user account may be registered by user account data (not shown in FIG. 1) stored by the computing device 102. User account data may include an email address, a first name, middle name, last name, phone number, address (e.g., street address, region, and/or country), payment information, and/or other user profile information. In some examples, the user account on the service provider platform (e.g., the computing device 102) may be separate from an (e.g., separate from any) account the user may have on the publisher platform(s) 130.

The processor 104 may execute the operation instructions 124 to perform one or more operations based on the identified single publisher domain. In some examples, performing one or more operations may include determining a logo based on (e.g., corresponding to) the single publisher domain. A logo is an image, symbol, and/or design. In some examples, a logo may correspond to a merchant, brand, product, and/or item. The logo may correspond to the publisher platform 130 (e.g., may correspond to a publisher, merchant, vendor, and/or service provider associated with the publisher platform 130).

In some approaches, the processor 104 may determine the logo by selecting, requesting, and/or retrieving the logo based on the identified single publisher domain. For example, the memory 106 may store a data structure that associates publisher domains (e.g., publisher domain names) with respective logos and/or references (e.g., memory addresses and/or web addresses, among other examples) to logos. The data structure may be a table, array, linked list, and/or tree, among other examples. The processor 104 may look up the logo corresponding to the identified single publisher domain (e.g., publisher domain name) and may retrieve (e.g., request, retrieve from memory, and/or retrieve from a web resource) the logo.

In some examples, the processor 104 may execute the operation instructions 124 to determine a merchant logo based on the single publisher domain. The merchant logo may correspond to a publisher (e.g., vendor, merchant and/or company, among other examples) associated with the publisher platform 130. For example, the merchant logo may be a business name, symbol, and/or image corresponding to the publisher platform 130 that initiated sending the email.

In some examples, performing an operation may include generating one or more pages. A page is data capable of being represented in a visual format. For example, a page may be a web page, one or more data objects for representation in an application, a list of text, and/or one or more images, among other examples. In some examples, a page may be formatted in extensible markup language (XML), hypertext markup language (HTML), and/or another format. In some examples, a page may be rendered and/or displayed using an application (e.g., browser application, web browser, and/or platform application, among other examples). For instance, the client computing device 136 may render and/or display a page from the service provider platform (e.g., computing device 102) using a browser application and/or a service provider platform application.

In some examples, performing an operation may include generating a shipment tracking page based on the merchant logo. For instance, the computing device 102 (e.g., processor 104) may generate a shipment tracking page that indicates a location of a shipment corresponding to an order placed to the publisher platform 130. The shipment tracking page may include a map and a marker including the merchant logo. The marker may mark the location of the shipment corresponding to the order on the map. In an example, the publisher platform 130 may initiate sending, from the originator platform 112 and to the client email platform 132, a shipment tracking email corresponding to an order placed by the client computing device 136 to the publisher platform 130. The computing device 102 may receive the shipment tracking email from the client email platform 132. The computing device 102 may collect URLs from the shipment tracking email and navigate to the corresponding final destination URLs. The computing device 102 may identify a single publisher domain of the publisher platform 130 based on the final destination URLs and may determine a merchant logo corresponding to the single publisher domain. The computing device 102 may utilize shipment information from the shipment tracking email to track the shipment and generate a shipment tracking page indicating a location of the shipment using the merchant logo.

In some examples, the processor 104 may execute the operation instructions 124 to cause the communication interface 126 to send the page to the client computing device 136. For instance, the communication interface 126 may send data (e.g., packet(s)) indicating the page to the client computing device 136 via the computer network 134. In some examples, the communication interface 126 may send the shipment tracking page to the client computing device 136.

In some examples, a page may include one or more data objects based on the single publisher domain. A data object may include media (e.g., an image(s), text, and/or video(s)). For instance, each data object may include media indicating a product, item, good, and/or service, among other examples. In some examples, the page may include data objects arranged in a grid that is movable vertically and/or horizontally. For instance, a column of data objects corresponding to orders may be movable vertically and a row of data objects corresponding to products in an order may be movable horizontally.

In some examples, the client computing device 136 may present the page. For instance, the client computing device 136 may include a display and/or may be coupled to a display to display a data object(s) of the page (e.g., shipment tracking page or other page). In some examples, the client computing device 136 may include an input device and/or may be coupled to an input device (e.g., touchscreen, mouse, keyboard, camera, etc.) to allow interaction with the page. For instance, the client computing device 136 (e.g., an application of the client computing device 136) may scroll the page vertically and/or horizontally based on an input(s) provided by the input device(s).

In some examples, the service provider platform (e.g., computing device 102 and/or processor 104) may perform one or more communications with the client computing device 136 before generating and/or sending the page. For example, the service provider platform may respond to a request sent from the client computing device 136 through an application, at a checkout page, and/or at an order confirmation page. The request may be a message indicating a request for information (e.g., one or more pages) from the service provider platform (e.g., computing device 102). For example, the communication interface 126 may receive, from the client computing device 136, the request. The request may include a user's email address and/or other information (e.g., an order number) to indicate a correspondence with order information received from the publisher platform 130 and/or from the client email platform 132.

In some examples, performing an operation may include determining one or more recommendations corresponding to the single publisher domain (e.g., corresponding to the publisher platform 130). For instance, the computing device 102 (e.g., processor 104) may determine one or more recommended products from one or more publisher platforms 130. For instance, the generated page may include one or more data objects indicating one or more pieces of order information and/or one or more recommendations. In some examples, generating the page may include determining a recommendation(s) using a recommendation engine. A recommendation engine is a model to determine a recommendation(s) (e.g., recommended item(s)). For instance, the recommendation engine may include a machine learning model(s), function(s), and/or mapping(s), etc., to determine a recommendation(s) based on one or more inputs. In some examples, a recommendation engine may determine a recommendation(s) that corresponds to the single publisher domain, that may be of interest to a user, that may be similar to a previously purchased product(s), that may be related to content that the user has interacted with, and/or that may align with the value(s) of a user, etc.

In some examples, the recommendation engine includes a machine learning model. A machine learning model may be trained to perform an operation based on examples or training data. For example, the recommendation engine may utilize a machine learning model or machine learning models that are trained to determine a recommendation(s) (e.g., recommended item(s)) based on one or more inputs (e.g., publisher domain names). Examples of a machine learning model(s) that may be utilized to determine a recommendation(s) may include a support vector machine (SVM), clustering (e.g., k-nearest neighbor), an artificial neural network(s), a fully connected neural network(s) (FCNN(s)), a long short-term memory (LSTM) model(s), random forest(s), decision tree(s), etc. In some examples, an artificial neural network may be a kind of machine learning model that may be structured with nodes, layers, and/or connections. Examples of neural networks may include convolutional neural networks (CNNs) (e.g., CNN, deconvolutional neural network, inception module, residual neural network, etc.), and/or recurrent neural networks (RNNs) (e.g., RNN, multi-layer RNN, bi-directional RNN, fused RNN, clockwork RNN, etc.). In some examples, training a machine learning model may include adjusting a weight or weights of the machine learning model (e.g., neural network(s)) based on training data. For example, the weight(s) may be adjusted to reduce or minimize losses, which may be calculated using a loss function. In some examples, a machine learning model may be periodically, repeatedly, and/or continuously updated and/or trained based on results and/or feedback. For instance, the machine learning model may be trained (e.g., updated) based on an item(s) (e.g., product(s), brand(s), person(s) (e.g., influencer(s)), company(s), vendor(s), and/or story(ies), etc.) selected and/or interacted with by a user. In some examples, the machine learning model may be trained (e.g., updated) based on an item(s) rejected and/or skipped by a user.

In some examples, the identification instructions 122 may include instructions to implement and/or execute the recommendation engine. For instance, the processor 104 may execute the recommendation engine instructions (not shown in FIG. 1) in the memory to utilize the recommendation engine in some configurations.

In some examples, the processor 104 may provide an input based on the single publisher domain to the recommendation engine. In some examples, the input may be the publisher domain name or may be determined based on the publisher domain name. For instance, the input may be the publisher domain name and/or text, an image(s), metadata, a number(s), etc., based on the order information. In some examples, the input may be a publisher domain name, product name, company name, vendor name, product identifier, UPC, price, shipping carrier, shipping timeline, geographic location, image, a cause (e.g., sustainable manufacturing, no child labor, minority-owned, etc.), and/or other data indicated by the order information (e.g., data from within the service provider network).

In some examples, the processor 104 may provide one or more other inputs to the recommendation engine. For instance, the processor 104 may provide order information from one or more previous orders to the recommendation engine. In some examples, the processor 104 may provide order information from one or more publisher platforms 130 and/or from one or more external data sources (e.g., client email platform(s) 132). In some examples, the recommendation(s) provided by the recommendation engine for the page may be constrained to include one or more recommendations from only the publisher platform 130 corresponding to the page (e.g., corresponding to the merchant of the current order).

In some examples, performing an operation may include determining that the identified single publisher domain corresponds to an untrusted domain. For instance, the computing device 102 (e.g., processor 104) may compare the publisher domain name to a database of domain names that are untrusted (e.g., that represent a potential security risk due to previous negative behavior, detected negative behavior during navigation, and/or unknown behavior). For instance, negative behavior may include sending spam messages, providing malware, providing spyware, providing adware, attempting to install a virus, sending fake products, engaging in fraudulent transactions, and/or providing phishing messages, among other examples. If the identified publisher domain name corresponds to an untrusted domain, the computing device 102 may send a notification to the client computing device 136 and/or a message to the client email platform 132 indicating that the corresponding publisher platform 130 may be included in an untrusted domain and/or indicating a potential security risk.

Figure 2:
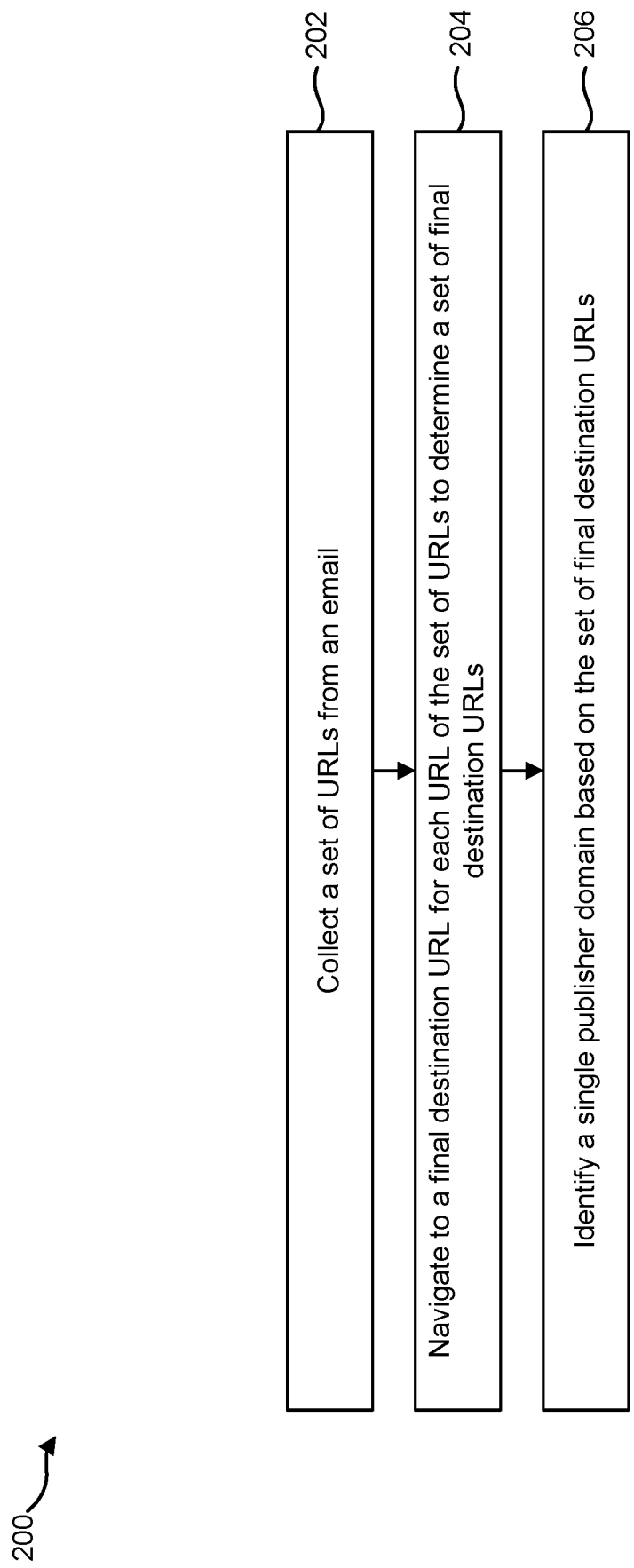
FIG. 2 is a flow diagram of an example method for domain identification for email content.

FIG. 2 is a flow diagram of an example method 200 for domain identification for email content. In some examples, the method 200 may be performed by the computing device 102 described in relation to FIG. 1. In some examples, the method 200 may include one or more of the functions, procedures, techniques, etc., described in relation to one or more of FIGS. 1-7.

At 202, the method 200 includes collecting, by a processor, a set of URLs from an email. For example, the computing device 102 may receive email information 110 from a client email platform 132 and may collect the set of URLs from the email. In some examples, collecting the set of URLs may be performed as described in relation to FIG. 1. For instance, the computing device 102 may discard a URL that includes a prohibited domain to produce the set of URLs. The prohibited domain may include an email service provider domain, a shipping provider domain, and/or a social media domain.

In some examples, the method 200 may include determining whether an originator domain name of the email matches an entry of a publisher index. Collecting the set of URLs may be performed in response to a determination that the originator domain name does not match an entry (e.g., any entry) of the publisher index.

At 204, the method 200 includes navigating, by the processor, to a final destination URL for each URL of the set of URLs to determine a set of final destination URLs. In some examples, navigating to the final destination URL(s) may be performed as described in relation to FIG. 1. For instance, the computing device 102 may follow one or more redirects of a URL of the set of URLs to navigate to a final destination URL corresponding to the URL. The one or more redirects includes a redirect from a publisher tracker domain, from a software as a service (SaaS) provider tracker domain, and/or from a secure link domain At 206, the method 200 includes identifying, by the processor, a single publisher domain based on the set of final destination URLs. In some examples, identifying the single publisher domain may be performed as described in relation to FIG. 1. For instance, the computing device 102 may count final destination domains of the set of final destination URLs. The method 200 may include determining a final destination domain with a greatest count as the single publisher domain.

In some examples, the method 200 may add, omit, combine, and/or divide an operation(s) described herein. For instance, the method 200 may include performing one or more of the operations, functions, techniques, etc., described in relation to FIG. 1.

FIGS. 3A-D are block diagrams illustrating different scenarios of sending emails to client computing devices 336*a-d*. The client computing devices 336*a-d* may be examples of the client computing device 136 described in relation to FIG. 1. The publisher platforms 330*a-d* may be examples of the publisher platform 130 described in relation to FIG. 1. The client email platforms 332*a-d* may be examples of the client email platform 132 described in relation to FIG. 1.

FIG. 3A is a block diagram illustrating a first-party publisher example 302. In FIG. 3A, a client computing device 336*a* sends registration information to a domain 342*a* (e.g., a public domain) of a publisher platform 330*a*. For example, the client computing device 336*a* may provide the publisher platform 330*a* with an email address to receive any communication from the publisher platform 330*a*. For instance, the client computing device 336*a* may send an email address to the publisher platform 330*a* via a network. In some examples, the registration process may occur once or may be repeated for various reasons (e.g., to change or update the email address). In some examples, the publisher platform 330*a* may obtain the email address as part of a mass list of emails that have been collected by a third party. The list may be provided to the publisher platform through an arrangement (e.g., purchase). In the example of FIG. 3A, the publisher platform 330*a* is an originator platform that sends emails to a client email platform 332*a*. The client computing device 336*a* may receive the email from the client email platform 332*a*. In this case, the originator domain is the same domain as the publisher domain. For instance, a separate originator platform is not utilized in the example of FIG. 3A.

FIG. 3B is a block diagram illustrating another first-party publisher example 304. In FIG. 3B, a client computing device 336*b* sends registration information to a domain 342*b* (e.g., a public domain) of a publisher platform 330*b*. Registration may occur as described above. In this example, the publisher platform 330*b* is an originator platform that sends emails to a client email platform 332*b*. The client computing device 336*b* may receive the email from the client email platform 332*b*. In this case, the originator domain is the mail domain 350*b* of the publisher platform 330*b*, which may be the same as (or different from) the domain 342*b* (e.g., public domain) of the publisher platform 330*b*.

FIG. 3C is a block diagram illustrating a third-party originator example 306. In FIG. 3C, a client computing device 336*c* sends registration information to a domain 342*c* (e.g., a public domain) of a publisher platform 330*c*. Registration may occur as described above. In this example, the publisher platform 330*c* sends content to an SaaS platform 352. The SaaS platform 352 may be an example of the originator platform 112 described in relation to FIG. 1. The SaaS platform 352 may provide one or more services to the publisher platform 330*c*, including generating the emails to send, sending out the email on behalf of the publisher platform 330*c*, and/or providing user analytics on the emails sent, etc. In some examples, the SaaS platform 352 may provide package tracking information and/or links to a package tracking system. The SaaS platform 352 sends email to a client email platform 332c. The client computing device 336c may receive the email from the client email platform 332c. In this case, the originator domain is the mail domain 350c of the SaaS platform 352, which may be different from the domain 342c (e.g., public domain) of the publisher platform 330c.

FIG. 3D is a block diagram illustrating another third-party originator example 308. In FIG. 3D, a client computing device 336d sends registration information to a domain 342d (e.g., a public domain) of a publisher platform 330d. Registration may occur as described above. In this example, the publisher platform 330d sends content to a publisher email platform 354. The publisher email platform 354 may be an example of the originator platform 112 described in relation to FIG. 1. In some examples, the publisher platform may correspond to a small merchant that uses a personal email account (e.g., an email account from an email service provider such as Gmail, Hotmail, and/or Yahoo, among other examples), to send out an email to the client email platform 332d. In some examples, the publisher email platform 354 may be the same as the client email platform 332d. The client computing device 336d may receive the email from the client email platform 332d. For instance, the publisher platform may send out tracking information, shipment information, etc., manually input by a user. In these scenarios, the mail domain 350d will be that of the publisher email platform 354 (e.g., gmail.com, hotmail.com, yahoo.com), which may be too ambiguous to reliably identify the domain 342d of the publisher platform 330d. In this case, the originator domain is the mail domain 350d of the publisher email platform 354, which may be different from the domain 342d (e.g., public domain) of the publisher platform 330d.

For the foregoing reasons, relying on the email originator for automated identification of the publisher domain may be difficult without human review and correction. Some examples of the techniques described herein may utilize additional information to automatically identify the publisher domain with increased accuracy.

In some examples, commercial email content may prompt a recipient user to take some action to visit the publisher domain. Since email content may not be interactive, the email body may contain URLs (e.g., links) that can redirect a computing device to interactive content on the public web. However, it may not be reliably assumed that the domains, as represented in the email, are the publisher domains.

For various reasons, the URLs may point to a domain that redirects to a different public domain. One example may be a URL endpoint (e.g., "tracker domain") that may log which link from the email body was clicked before redirecting to the publisher domain. The URL of the publisher domain may be encoded within the source or represented by a token that points to a private resource (e.g., a database), where the destination URL is stored. One way to determine the final destination URL in the latter case is to follow the URL and any redirects until the final destination URL is returned.

FIGS. 4A-E are block diagrams illustrating different scenarios of navigating domains from client computing device 436a-e based on URLs in an email. The client computing devices 436a-e may be examples of the client computing device 136 described in relation to FIG. 1. The publisher platforms 430a-e may be examples of the publisher platform 130 described in relation to FIG. 1. The client email platforms 432d-e may be examples of the client email platform 132 described in relation to FIG. 1. In some examples of the techniques described herein, a computing device (e.g., computing device 102) may follow one or more URLs through one or more redirects to determine a final destination URLs.

While the client computing devices 436a-e are illustrated as navigating domains in FIGS. 4A-E, another computing device (e.g., computing device 102) may navigate the domains through one or more redirects to determine final destination URLs as described herein.

FIG. 4A illustrates an example of navigating to a domain 442a of a publisher platform 430a. For instance, FIG. 4A illustrates a first scenario 402 where a link in the email causes the client computing device 436a to navigate directly back to the domain 442a of the publisher platform 430a (without a redirect, for example).

FIG. 4B illustrates an example of navigating to a domain 442b of a publisher platform 430b via a tracker domain 456b of the publisher platform 430b. In a second scenario 404, one publisher may own both the tracker domain 456b and the domain 442b (e.g., public domain). For instance, FIG. 4B illustrates a second scenario 404 where a link in the email causes the client computing device 436a to navigate to the tracker domain 456b of the publisher platform 430b. The client computing device 436b may follow a redirect (e.g., http redirect) from the tracker domain 456b to the domain 442b.

FIG. 4C illustrates an example of navigating to a domain 442c of a publisher platform 430c via a tracker domain 456c of an SaaS platform 454c. In a third scenario 406, the SaaS platform 454c may utilize the tracker domain 456c and the publisher platform 430c may utilize the domain 442c (e.g., public domain of the publisher). For instance, FIG. 4C illustrates a third scenario 406 where a link in the email causes the client computing device 436c to navigate to the tracker domain 456c of the SaaS platform 454c. The client computing device 436c may follow a redirect (e.g., http redirect) from the tracker domain 456c to the domain 442c of the publisher platform 430c.

FIG. 4D illustrates an example of navigating to a domain 442d of a publisher platform 430d via a security domain 458d of a client email platform 432d. In a fourth scenario 408, the client email platform 432d may utilize the security domain 458d and the publisher platform 430d may utilize the domain 442d (e.g., public domain of the publisher). For instance, FIG. 4D illustrates a fourth scenario 408 where a link in the email causes the client computing device 436d to navigate to the security domain 458d of the client email platform 432d and to the domain 442d of the publisher platform 430d. For instance, the security domain 458d may be a Safe Links domain provided by a Microsoft Outlook/Exchange service. The client computing device 436d may follow a redirect (e.g., http redirect) from the security domain 458d to the domain 442d of the publisher platform 430d.

FIG. 4E illustrates an example of navigating to a domain 442e of a publisher platform 430e via a security domain 458e of a client email platform 432e and a tracker domain 456e of an SaaS platform 454c. In a fifth scenario 410, the client email platform 432e may utilize the security domain 458e, the SaaS platform 454e may utilize the tracker domain 456e, and the publisher platform 430e may utilize the domain 442e (e.g., public domain of the publisher). For instance, FIG. 4E illustrates a fifth scenario 410 where a link in the email causes the client computing device 436e to navigate to the security domain 458e of the client email platform 432e, to the tracker domain 456c of the SaaS platform 454c, and to the domain 442e of the publisher platform 430e. The client computing device 436c may follow a redirect (e.g., http redirect) from the security domain 458e to the tracker domain 456c, and may follow another redirect (e.g., http redirect) from the tracker domain 456e to the domain 442e of the publisher platform 430c.

Figure 4F:
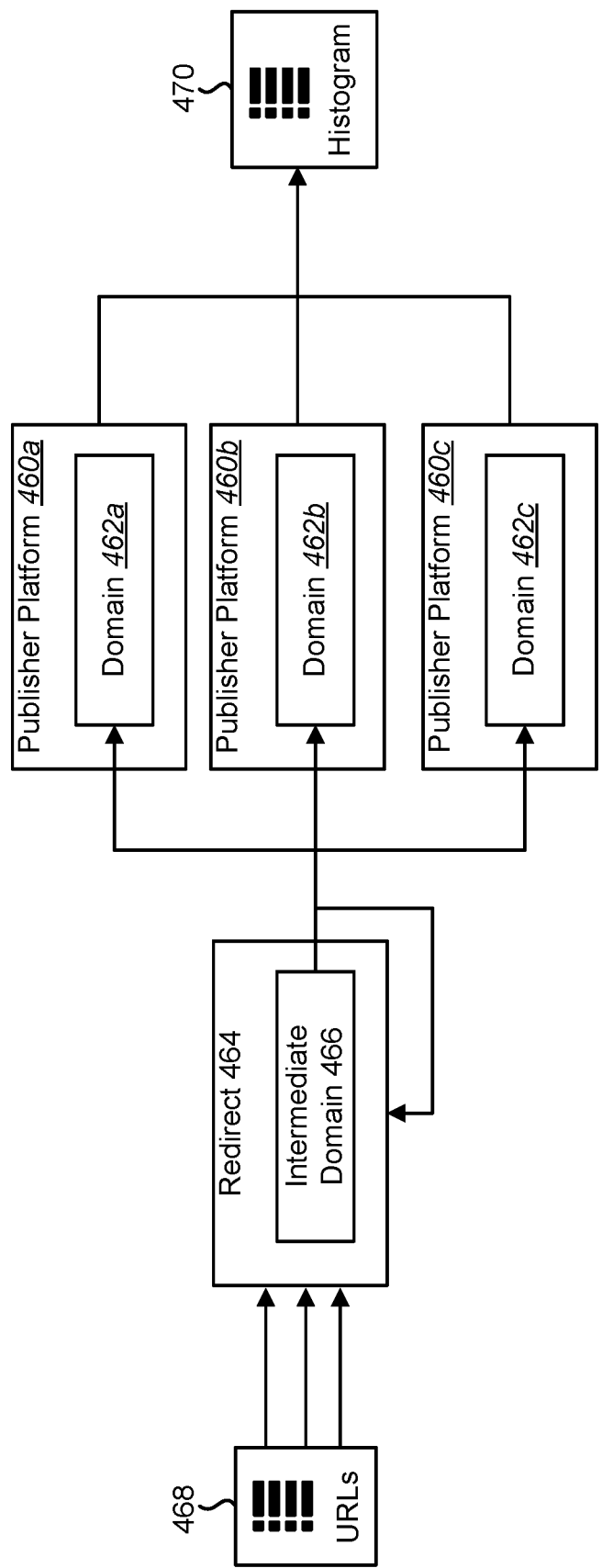
FIG. 4F is a block diagram illustrating a number of URLs being followed to create a histogram in accordance with some of the techniques described herein.

FIG. 4F is a block diagram illustrating a number of URLs 468 being followed to create a histogram 470 in accordance with some of the techniques described herein. In some examples, not all URLs in an email will point to publisher domains. However, a majority of URLs in a single email may lead to the publisher domains. For example, a computing device (e.g., computing device 102) may collect the URLs 468 in an email, may make a request for each, and may follow all redirects 464 though one or more intermediate domains 466 until the final destination URLs (e.g., domains 462a-c of the publisher platforms 460a-c) are returned. The computing device may calculate a histogram 470 of all of the domains 462a-c using the final destination URLs (e.g., may add the domain of each URL to the histogram 470). Once the histogram 470 has been calculated, the domain with the highest count may be identified as the publisher domain.

Modifications to the present systems and method may involve optimizations to avoid following all URLs in the email. Some approaches may first try to decode URLs to look for the destination instead of following every URL. Some approaches may collect a list of domains not to follow (e.g., links to social media pages). Some examples may explicitly search for URLs of specific domains (e.g., Twitter, Facebook, Instagram) to determine whether the URLs point to a profile of the email publisher. In some examples, the email may be inspected for "mailto" links as an additional data source to help improve accuracy.

Figure 5:
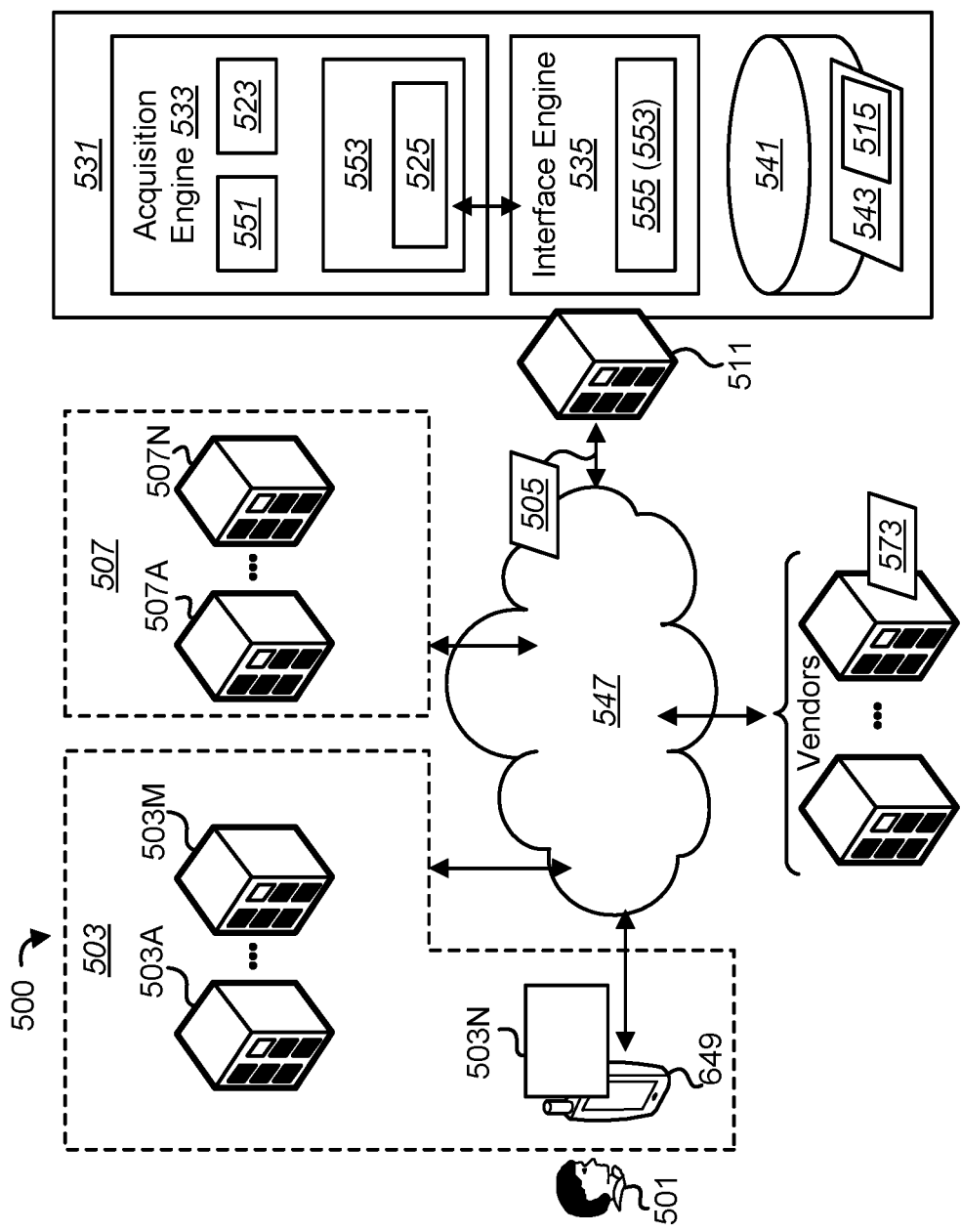
FIG. 5 is a schematic block diagram illustrating one example of a system for domain identification for email content, as described herein.

FIG. 5 is a schematic block diagram illustrating one example of a system 500 for domain identification for email content, as described herein. The system 500 may comprise a service provider platform 531. The service provider platform 531 may be utilized to perform domain identification, account creation, transaction aggregation, transaction management, transaction visualization, and/or page generation. The service provider platform 531 may be an example of the service provider platform described in relation to FIG. 1. The service provider platform 531 may comprise a network-accessible service comprising and/or embodied by one or more computing systems, such as a computing system 511. The computing system 511 may comprise one or more computing devices (e.g., one or more server computing devices, rack mounted computing devices, blade computing devices, clustered computing devices, and/or the like). In some examples, the computing device 102 described in relation to FIG. 1 may be included in the computing system 511. Portions of the service provider platform 531 (and/or services, systems, modules, agents, engines, methods, processes and/or operations described herein) may comprise and/or be embodied by hardware computing resources of the computing system 511, which may include, but are not limited to: processing resources (e.g., a processor, a general-purpose processor, an application-specific processor, an Application-Specific Integrated Circuit (ASIC), a Field Programmable Gate Array (FPGA)), memory resources (e.g., volatile memory resources, random access memory (RAM), dynamic RAM, static RAM, persistent memory, battery-backed RAM, and/or the like), non-transitory storage resources (e.g., a hard drive, solid-state storage device, local storage device, network-attached storage system, and/or the like), network interface resources (e.g., a network interface device, a network interface card, and/or the like), and so on (not shown in FIG. 5 to avoid obscuring details of the illustrated examples).

The service provider platform 531 may comprise and/or may be operatively coupled to a data store 541. The data store 541 may comprise any suitable means for persistently storing, maintaining, manipulating, and/or retrieving data, including, but not limited to one or more: storage devices, local storage devices, remote storage devices (e.g., network attached storage devices), hard disk drives, solid-state storage devices, data management systems, databases, and/or the like. As used herein, "data" refers to electronically encoded information corresponding to any suitable format, encoding, representation, and/or structure. In some examples, the service provider platform 531 (and/or portions thereof) may be embodied as computer-readable instructions stored on the data store 541, the computer-readable instructions configured to cause the computing system 511 to implement operations for account creation, for aggregating, managing, and/or for visualizing user transaction data, and/or to implement operations for generating one or more pages, as described herein. In some examples, the memory 106 described in relation to FIG. 1 may be included in the data store 541.

The service provider platform 531 may be communicatively coupled to an electronic communication network (network 547). The network 547 may comprise any suitable means for electronic communication, including, but not limited to: an Internet Protocol (IP) network, the Internet, a wireless network, a Local Area Network (LAN), a Wide Area Network (WAN), a Virtual Private Network (VPN), a wireless network (e.g., IEEE 802.11a-n wireless network, Bluetooth® network, Near-Field Communication (NFC) network, and/or the like), a public switched telephone network (PSTN), a mobile network (e.g., a network configured to implement one or more technical standards or communication methods for mobile data communication, such as Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), High Speed Uplink Packet Access (HSUPA), Long Term Evolution (LTE), LTE-A (Long Term Evolution-Advanced), and/or the like), a combination of networks, and/or the like.

The service provider platform 531 may comprise an acquisition engine 533 configured to retrieve information pertaining to user transactions (e.g., order information) from one or more data sources, which may comprise transaction data sources 503, shipment data sources 507, vendor data sources, and/or the like. The service provider platform 531 may further comprise an interface engine 535 configured to, inter alia, generate interfaces configured to display visual representations of user transactions (and/or transaction shipments) pertaining to a plurality of different vendors and/or a plurality of different carriers. The interfaces may provide for managing and/or visualizing user transactions, in some examples. In some examples, the interface engine 535 is configured to provide interfaces capable of displaying a visualization representation of a plurality of different transactions and/or a plurality of different transaction shipments that span a plurality of different vendors and/or different carriers within a single, unified map-based interface. In some examples, the interface engine 535 may be configured to produce one or more pages and/or interfaces as described herein.

The acquisition engine 533 may be configured to obtain email information (e.g., URLs in an email), obtain information pertaining to transactions involving respective users 501 of the service provider platform 531, extract information pertaining to respective transactions involving the users (e.g., order information), acquire shipment status information pertaining to transaction shipments, aggregate and/or combine the transaction data, and so on. In some examples, the acquisition engine 533 may be configured to obtain order information, email information 110, catalog data, and/or user account data as described in relation to FIG. 1. As used herein, a "user" (a user 501) may refer to one or more of an individual, a group, an entity, an organization, a corporation, a partnership, and/or the like. A user 501 may be represented by a user record 543, which may be embodied as electronically encoded information maintained on non-transitory storage of the service provider platform 531 (e.g., within the data store 541). The service provider platform 531 may be configured to obtain registration information (e.g., user profile data) pertaining to a user 501, receive the registration information, and record the registration information within a corresponding user record 543. The service provider platform 531 may be further configured to secure user records 543 (and corresponding information pertaining to the user 501), which may comprise encrypting data transmitted on the network 547 (e.g., encrypt registration data during transport from a client computing device 649 to the service provider platform 531), encrypting data received at the service provider platform 531 (e.g., encrypting user records 543 stored within the data store 541), controlling access to user records 543, and so on.

A user record 543 may comprise any suitable information pertaining to a user 501, including, but not limited to: an identifier, contact information (e.g., email address, instant messaging address, phone number, and/or the like), preferences, settings, profile information, usage data, user profile data, and/or the like. The user 501 may enter into transactions with one or more vendors. In some examples, the user 501 may enter into transactions through ecommerce platforms of one or more vendors (through network-accessible services, systems, and/or platforms configured to facilitate transactions, such as an on-line store, automated ordering system, and/or the like). In some examples, information pertaining to transactions of the user 501 may be maintained within and/or accessible from one or more network-accessible data sources. As used herein, a network accessible data source refers to a system, service, and/or platform configured to maintain and/or provide access to information pertaining to transactions and/or transaction shipments involving the user 501.

In the example of FIG. 5, information pertaining to transactions between the user 501 and one or more vendors may be maintained by and/or accessible from one or more transaction data sources 503A-N. A transaction data source 503 may comprise a service configured to receive, maintain, and/or provide access to messages pertaining to user transactions with one or more vendors. A transaction data source 503 may include, but is not limited to: an email system, messaging service, instant messaging service, text messaging service, transaction management system, account management system, a banking system, an accounting system, an ecommerce system, a storefront, and/or the like. A transaction data source 503 may comprise an account at which the user 501 receives messages pertaining to transactions corresponding to one or more vendors (e.g., may comprise an email account to which the one or more vendors are configured to send order, shipping, delivery, and/or other messages pertaining transactions therewith). Alternatively, or in addition, a transaction data source 503 may comprise and/or correspond to an ecommerce system through which the user 501 performs transactions (e.g., a transaction data source 503 may comprise a network accessible service of a vendor). Although particular examples of transaction data sources 503 are described herein, the disclosure is not limited in this regard and could be adapted for integration with any suitable means for obtaining information pertaining to user transactions, in some examples. Moreover, although FIG. 5 depicts the transaction data sources 503 and vendors as separate entities, the disclosure is not limited in this regard and could be adapted for use in configurations in which user transaction information is maintained by and/or accessible through transaction data sources 503 managed by respective vendors, and/or the like (e.g., a transaction data source 503 may correspond to a network-accessible service of a vendor, or vice versa). In some examples, the transaction data sources 503A-N may include one or more data sources (e.g., a first data source) in a service provider network and/or may include one or more data sources (e.g., a second data source) outside of a service provider network.

A user record 543 may further comprise and/or reference data pertaining to data sources associated with the user 501 (access data 515). The access data 515 registered by a user 501 for a particular data source may be configured to enable the acquisition engine 533 to access and/or extract information pertaining to transactions involving the user 501 therefrom. The access data 515 registered for a transaction data source 503 may comprise any suitable information, including, but not limited to: an identifier (e.g., a name, label, and/or other identifier associated with the transaction data source 503), access information (e.g., a network address, network port, Uniform Resource Identifier (URI), Uniform Resource Locator (URL), or other address information by which the transaction data source 503 may be accessed), access protocol information (e.g., an Application Programming Interface (API), a query and/or access mechanism supported by the transaction data source 503, such as Structured Query Language (SQL), Simple Object Access Protocol (SOAP), and/or the like), an identifier of the user 501 at the transaction data source 503 (e.g., a user name, a user identifier, an account name, an account identifier, an email address, and/or other identifier by which the user 501 is identified at the transaction data source 503), authentication data to enable the acquisition engine 533 to authenticate to and/or securely access data pertaining to the user 501 at the transaction data source 503 (e.g., an authentication credential, a token, a password, a password hash, a key, a public key, a private key, a signature, and/or the like), and so on. In one example, first access data 515 registered by a user 501 may be configured to enable the acquisition engine 533 to access a first email account of the user 501 managed by a first transaction data source 503, second access data 515 registered by the user 501 may be configured to enable the acquisition engine 533 to access a second email account of the user 501 managed by a second transaction data source 503, third access data 515 may be configured to enable the acquisition engine 533 to access text messages of the user 501 managed by a third transaction data source 503, and/or fourth access data 515 may be configured to enable the acquisition engine 533 to access an account of the user 501 with a specified vendor managed by a fourth transaction data source 503, and so on.

The acquisition engine 533 may use the access data 515 to obtain data pertaining to user transactions and/or corresponding transaction shipments (raw data transaction and/or shipment data 505). As used herein, raw transaction and/or shipment (RTS) data 505 refers to any data pertaining to a user transaction and/or transaction shipment, including, but not limited to: data pertaining to respective transactions involving the user maintained by and/or within more transaction data sources 503, data pertaining to the status of transaction shipments maintained by and/or within one or more shipment data sources 507, and/or the like. RTS data 505 may be accessed from a plurality of different data sources, each configured to maintain and/or provide access to transaction data in accordance with a respective configuration. Accordingly, RTS data 505 acquired from different data sources (e.g., different transaction and/or shipping data sources 503 and/or 507) may correspond to different respective configurations (e.g., different respective layouts, structures, schemas, encodings, formats, representations, namespaces, access protocols, and/or the like). In some examples, the acquisition engine 533 may be configured to acquire information pertaining to transactions involving the user 501 (e.g., transaction data). The acquisition engine 533 may be configured to import RTS data 505 from a plurality of different data sources in accordance with different configurations, which may comprise transforming the RTS data 505 from each of a plurality of different configurations into a uniform configuration. The acquisition engine 533 may be further configured to maintain RTS data 505 acquired from different data sources (and/or having different configurations) in uniform data structures (e.g., transaction records 525). In some examples, the acquisition engine 533 is configured to extract, import, and/or maintain transaction records 525, each transaction record 525 comprising information pertaining to a respective transaction involving the user 501. A transaction record 525 may comprise any suitable information pertaining to a transaction, including, but not limited to: a vendor identifier (e.g., an identifier corresponding to the vendor associated with the transaction, such as a vendor name, vendor address, vendor URI, vendor URL and/or the like), a vendor transaction identifier (VTI) (an vendor-specific identifier assigned to the transaction by the vendor, such as an order number, invoice number, transaction URI, transaction URL, and/or the like), a transaction identifier (e.g., an identifier configured to uniquely identify the transaction record 525 and/or transaction represented thereby within the service provider platform 531 (e.g., transaction platform), may comprise a combination of a vendor-specific identifiers, such as the vendor identifier and/or vendor transaction identifier, in some examples), items purchased by the user 501 in the transaction (e.g., item name, Universal Product Code (UPC), item options, item price, item quantity, URI of the item at the vendor, URL of the item at the vendor, and/or the like), information pertaining to the value of the transaction (e.g., item cost, taxes, shipping cost, insurance cost, and/or the like), receipts (e.g., information pertaining to payments remitted to the vendor pursuant to the transaction, and/or the like), information pertaining to insurance covering the transaction (if any), transaction status information (e.g., an indicator of whether the transaction is pending, in process, completed, and/or the like), and so on. A transaction record 525 may further comprise information pertaining to shipments associated with the transaction (e.g., information pertaining to transaction shipments comprising items purchased in the transaction). The information pertaining to a transaction shipment acquired from a transaction data source 503 may include, but is not limited to: an identifier of the carrier assigned to handle the shipment (e.g., a name, label, identifier, URI, URL, or other identifying information pertaining to the carrier), a shipment identifier (e.g., a identifier configured to identify the shipment at the carrier and/or access status information pertaining to the shipment, such as a tracking number, confirmation number, delivery confirmation number, and/or the like), shipment status information, and so on. In some examples, a transaction record 525 may comprise information pertaining to a plurality of transaction shipments, each representing a respective shipment associated with the transaction (e.g., a shipment comprising respective items purchased in the transaction).

In the FIG. 5 example, the acquisition engine 533 may be configured to obtain data pertaining to transactions involving the user 501 (RTS data 505) from a plurality of transaction data sources 503A-N. Transaction data sources 503A-M may comprise third-party network-accessible systems (e.g., email systems, messaging platforms, and/or the like). The acquisition engine 533 may be further configured to obtain user transaction data from one or more "local" transaction data sources 503. As used herein, a local transaction data source 503 refers to a transaction data source 503 corresponding to a particular user 501 (and/or client computing device 649 of the user 501). In the FIG. 5 example, the acquisition engine 533 may be configured to obtain RTS data 505 from transaction data source 503N, which may comprise and/or correspond to a client computing device 649 of the user 501. The transaction data source 503N may comprise data associated with one or more other transaction data sources 503A-M (e.g., may comprise data cached on the client computing device 649, such as one or more email messages corresponding to an email account of the user 501 managed by another one of the transaction data sources 503A-M). Alternatively, or in addition, the transaction data source 503N may comprise data produced and/or maintained on the client computing device 649, such as data pertaining to transactions executed by the user 501 on the computing device 649.

In some examples, a transaction data source 503 may be configured to maintain information pertaining to the user 501 in one or more data records. As used herein, a data record may comprise any suitable collection of electronically encoded information, including, but not limited to: a message, an email message, URLs in an email message, an instant message, a text message, a data structure, unstructured data (e.g., a data blob), an object, a data record, a transaction record, a database record, JavaScript Object Notation (JSON) data, HyperText Markup Language (HTML) data, extensible Markup Language (XML) data, and/or the like. The acquisition engine 533 may be configured to: access data records maintained by respective data sources (e.g., transaction data sources 503A-N), identify information pertaining to transactions involving the user 501 within one or more of the accessed data records, extract RTS data 505 from the identified data records, and import the RTS data 505 into the service provider platform 531. The acquisition engine 533 may access data records managed by a data source (e.g., transaction data source 503) using any suitable means including, but not limited to: requesting data records from the data source (e.g., sending requests to the data source through the network 547), querying the data source (e.g., submitting queries to the data source through the network 547), utilizing a data access interface provided by the data source (e.g., a data access API), searching the data source, reading data records and/or metadata from a storage system associated with the data source, and/or the like. Identifying information pertaining to a user transaction within a data record may comprise interpreting, searching, parsing, and/or analyzing the data record. The extracting may comprise retrieving RTS data 505 corresponding to the identified information pertaining to the user transaction from the data record. Importing the RTS data 505 may comprise incorporating the RTS data 505 into one or more transaction records 525. The importing may comprise generating one or more transaction records 525, updating one or more transaction records 525, and/or the like.

In some examples, the acquisition engine 533 may be configured to identify and/or extract RTS data 505 from a transaction data source 503 using a set of pre-determined extraction rules 551. The extraction rules 551 may comprise any suitable means for accessing, identifying and/or extracting electronically encoded information from a transaction data source 503 and/or data record(s) managed thereby. The extraction rules 551 may comprise and/or be embodied by computer-readable instructions, configuration data, classification data, classification criteria, and/or the like. The extraction rules 551 may comprise filter criteria configured to identify data records, of a plurality of data records, that comprise (or are likely to comprise) information pertaining to a user transaction. The extraction rules 551 may be further configured to distinguish and/or exclude data records that do not comprise (or are unlikely to comprise) information related to user transactions. The extraction rules 551 may further comprise parsing instructions configured to enable the acquisition engine 533 to interpret data managed by respective data sources (e.g., data records), identify RTS data 505 therein, and/or extract the identified RTS data 505. An extraction rule 551 may specify keywords, phrases, terms, and/or patterns that are indicative of user transaction data (e.g., keywords, phrases, terms, and/or patterns in the title, subject line, body, and/or metadata of email messages that relate to user transactions). By way of non-limiting example, an extraction rule 551 may specify that email messages having a subject line of "order confirmation" or "shipment notification" (or are from an address corresponding to a particular pattern, such as "orders@vendor.com") comprise transaction data, and may further specify location(s) within the data record from which corresponding RTS data 505 may be extracted therefrom. Alternatively, or in addition, one or more of the extraction rules 551 may correspond to a machine learning classifier, such as a Bayesian classifier, a neural network, and/or the like. The extraction rule 551 may be configured to classify data records as transaction related or non-transaction related (and/or classify data records as comprising particular types of transaction data and/or as comprising transaction data at specified locations). In some examples, the extraction rules 551 may be configured to identify and/or parse data records corresponding to particular transaction types and/or transactions pertaining to particular vendors. By way of further non-limiting examples, a first extraction rule 551 may be configured to identify and extract RTS data 505 from data records (e.g., email messages) associated with a first vendor, a second extraction rule 551 may be configured to identify and extract RTS data 505 from data records (e.g., email messages) associated with a second vendor, and a third extraction rule 551 may be configured to identify and extract RTS data 505 from data records accessed directly from a specified vendor (through an API provided by the specified vendor). Although particular examples of extraction rules 551 are described herein, the disclosure is not limited in this regard and could be adapted to utilize any suitable means for identifying and/or extracting RTS data 505 from electronically encoded information (e.g., data records maintained by and/or accessed from respective transaction data sources 503).

In some examples, a data source (e.g., one or more of the transaction data sources 503A-N) may be configured to maintain data pertaining to user transactions in accordance with a respective configuration (e.g., a respective layout, structure, schema, encoding, format, representation, namespace, and/or the like), and may make such data records accessible in accordance with a respective protocol (e.g., a specified data access mechanism, API, query language, and/or the like). Accordingly, the acquisition engine 533 may be configured to access transaction data in accordance with a plurality of different protocols, and extract RTS data 505 corresponding to a plurality of different configurations.

In some examples, the acquisition engine 533 may comprise and/or be communicatively coupled to an integration module 523, which may comprise and/or be embodied by computer-readable instructions (and/or other configuration data) configured to enable the acquisition engine 533 to import transaction data from a plurality of different data sources. The integration module 523 may enable the acquisition engine 533 to: access, query, and/or retrieve data managed by a plurality of different data sources (in accordance with different data access protocols supported by the respective data sources, in some examples); interpret, parse, and/or analyze data corresponding to a plurality of different configurations; identify, retrieve, and/or extract RTS data 505, and incorporate the extracted RTS data 505 into the service provider platform 531.

In some examples, data sources may be configured to manage data in accordance with respective configurations (native configurations). The native configuration of a data source may define one or more of a layout, structure, schema, encoding, format, representation, namespace, and/or other aspects of data accessed, queried, retrieved, and/or extracted therefrom. Accordingly, extracting data from different data sources may comprise accessing, querying, retrieving, interpreting, parsing, analyzing, and/or extracting data in accordance with different native configurations of the different data sources, and RTS data 505 extracted from the different data sources may correspond to the native configurations of the respective data sources (e.g., RTS data 505 extracted from a first data source may comprise data corresponding to a first configuration and RTS data 505 extracted from a second data source may comprise data corresponding to a second configuration, different from the first configuration). The integration module 523 may be configured to interpret data managed by a plurality of different data sources (in accordance with different respective configurations). The integration module 523 may be further configured to reconfigure native RTS data 505, which may comprise converting the RTS data 505 from a native configuration to a target configuration. The target configuration may comprise a uniform configuration for information pertaining to respective transactions, which may be adapted to represent transactions corresponding to a plurality of different vendors, associated with transaction shipments handled by a plurality of different carriers, and comprising data (RTS data 505) corresponding to a plurality of different configurations and/or extracted from a plurality of different data sources in accordance with a plurality of different access protocols. In some examples, the target configuration may comprise and/or correspond to a target namespace, which may comprise a uniform namespace configured to encompass a plurality of local or native namespaces (e.g., namespaces corresponding to respective vendors, carriers, data sources, and/or the like). In the FIG. 5 example, the target configuration may correspond to and/or be defined by a configuration of the transaction records 525 maintained by the acquisition engine 533, and the target namespace may correspond to identifying information assigned to and/or associated with the respective transaction records 525 (e.g., transaction and/or shipment identifiers assigned to respective transaction records 525 and/or transaction shipments). Transforming data from a native configuration to the target configuration may comprise performing one or more operations, which may include, but not limited to: remapping operations, manipulation operations, derivation operations, normalization operations, and/or the like. Remapping operations may comprise remapping selected elements and/or fields of native data (RTS data 505) to a uniform set of elements and/or fields of the target configuration (e.g., elements and/or fields of a transaction record 525). Remapping may comprise assigning uniform and/or normalized names, labels, and/or other semantic metadata to respective fields (columns or attributes). Manipulation operations may comprise manipulating respective fields, entries, and/or elements of the native data. A manipulation operation may pertain to one or more fields (columns or attributes) of the native data, and may comprise: adding, removing, splitting, joining, and/or otherwise manipulating the one or more fields. Alternatively, or in addition, a manipulation operation may pertain to one or more entries (rows or tuples) of the native data, and may comprise aggregating, combining, splitting and/or otherwise manipulating the one or more entries. In some examples, a manipulation operation may pertain to one or more elements of the native data (data values), and may comprise scaling, converting, transacting, transforming, replacing, and/or otherwise manipulating the one or more elements. Derivation operations may comprise deriving data corresponding to the native data, which may comprise performing calculations incorporating one or more fields (columns or attributes), entries (rows or tuples), elements (data values), and/or the like. A derivation operation may comprise deriving data for a new field (a new column or attribute), an existing field, a combination of fields, an existing entry, a combination of entries, and/or the like.

Normalization operations may comprise manipulating the structure and/or contents of the native data (e.g., identifiers, fields, and/or elements, and/or the like), such that the resulting data may be referenced, queried, and/or managed in accordance with uniform identifiers, fields, and/or elements (may be maintained within uniform transaction records 525). Normalization operations may further comprise translating RTS data 505 from one or more local or native namespaces to a uniform namespace. The uniform namespace may correspond to the transaction records 525 maintained within the service provider platform 531, which may comprise RTS data 505 pertaining to transactions corresponding to a plurality of different vendors and/or transaction shipments being handled by a plurality of different carriers, which may be accessed and/or extracted from a plurality of different data sources in accordance with a plurality of different protocols and/or configurations. The transaction records 525 maintained by the acquisition engine 533 may, therefore, comprise information pertaining to a plurality of different namespaces (native or local namespaces). As used herein, "native" or "local" namespaces may refer to namespaces associated with RTS data 505 accessed, extracted, and/or imported into the service provider platform 531, in some examples, which may include, but are not limited to: a plurality of data source namespaces (namespaces corresponding to respective data sources), a plurality of vendor namespaces (namespaces corresponding to respective vendors), a plurality of carrier namespaces (namespaces corresponding to respective carriers), and/or the like. RTS data 505 pertaining to a transaction between a user 501 and a particular vendor (and/or a transaction shipment being handled by a specified carrier) may correspond to the native namespace of the particular vendor, the specified carrier, the data source from which the RTS data 505 was extracted, and/or the like; RTS data 505 may comprise: a VTI corresponding to the namespace of the particular vendor (an identifier assigned to a transaction by the particular vendor and by which the particular vendor references the transaction, e.g., a vendor transaction identifier, in some examples), a vendor-specific user name (an name or other identifier by which the particular vendor references the user 501, which may differ from an identifier used to reference the user 501 within the service provider platform 531), a carrier shipment identifier (CSI) (an identifier assigned to the shipment by the carrier and by which the carrier tracks the shipment and/or provides access to status data pertaining to the shipment), a carrier-specific receiver name (e.g., an identifier assigned to the receiver of the shipment, which may differ from a name and/or identifier of the user 501 within the service provider platform 531), and/or the like.

In some examples, importing RTS data 505 may comprise implementing normalization operations to translate the RTS data 505 from one or more of a plurality of different native namespaces into the uniform namespace corresponding to the transaction records 525 maintained within the service provider platform 531. The normalization operations may comprise translating native data from one or more native namespaces into the uniform namespace (and/or deriving identifying information corresponding to the uniform namespace from identifying information of the RTS data 505, such as names, qualified names, identifiers, and/or the like). The normalization operations may, therefore, comprise associating RTS data 505 with global or uniform identifying information. As used herein, "global" or "uniform" identifying information may refers to names, qualified names, identifiers, and/or other identifying information corresponding to the uniform namespace (e.g., capable of being identified, referenced, queried, searched, indexed, and/or managed within the uniform namespace). In some examples, the normalization operations may comprise determining uniform transaction identifiers (transaction identifiers) from information corresponding to a vendor-specific native namespace. The normalization operations may comprise determining a transaction identifier corresponding to the uniform namespace from a combination of a vendor-specific VTI and/or another identifier. In some examples, determining transaction identifiers for RTS data 505 pertaining to transactions corresponding to respective vendors may comprise combining VTI assigned by the respective vendors with identifiers of the respective vendors. The normalization operations may further comprise determining uniform shipment identifiers (shipment identifiers) from information corresponding to a carrier-specific native namespace (e.g., generating shipment identifiers by, inter alia, combining (CSI assigned by respective carriers with identifiers of the respective carriers). The normalizing may, therefore, comprise translating RTS data 505 from a plurality of different native namespaces into a uniform namespace, which may comprise associating RTS data 505 (and/or corresponding transaction records 525) with global and/or uniform identifiers corresponding to the uniform namespace by use of identifiers corresponding to a plurality of different native namespaces (e.g., vendor, carrier, and/or data store namespaces).

Normalizing RTS data 505 may further comprise determining whether the RTS data 505 corresponds to an existing transaction record 525 using one or more uniform identifiers associated therewith. The determining may comprise associating the RTS data 505 with a uniform transaction identifier (a transaction identifier derived from a VTI included in the RTS data 505 and/or one or more other identifiers associated with the corresponding vendor), and determining whether an existing transaction record 525 comprises the uniform transaction identifier. Alternatively, or in addition, the determining may comprise associating the RTS data 505 with a uniform shipment identifier (a shipment identifier derived from a (CSI included in the RTS data 505 and/or one or more other identifiers associated with the corresponding carrier), and searching for an existing transaction record 525 (and/or transaction shipment) comprising the uniform transaction identifier. In response to determining that the RTS data 505 corresponds to an existing transaction record 525 (and/or transaction shipment), the RTS data 505 may be incorporated therein (e.g., may be incorporated into and/or used to update the existing transaction record 525 and/or transaction shipment). In response to determining that the RTS data 505 does not correspond to an existing transaction record 525, the acquisition engine 533 may generate a new transaction record 525 (and/or transaction shipment), and incorporate the RTS data 505 therein, which may comprise one or more of: associating the new transaction record 525 with the unique transaction identifier, associating the transaction shipment with the unique shipment identifier, and/or the like. The namespace normalization operations disclosed herein may, therefore, prevent creation of duplicate transaction records 525, and/or enable transaction records 525 comprising RTS data 505 corresponding to a plurality of different native namespaces (e.g., different data source, vendor, and/or carrier namespaces) to be identified, referenced, queried, searched, accessed, and/or otherwise managed within a same, uniform namespace.

In some examples, the integration module 523 may be configured to implement data transforms in accordance with pre-determined integration rules, which may comprise and/or correspond to one or more of the extraction rules 551, in some examples (not separately shown in FIG. 5 to avoid obscuring details of the illustrated examples). The integration rules may define remapping, normalization, transform, derivation, and/or other operations for accessing, extracting, and/or importing RTS data 505 from each of a plurality of data sources, each data source having a different respective native configuration. The integration rules may comprise and/or be embodied by respective integration components (e.g., libraries, computer-readable instructions, and/or the like) stored on a non-transitory storage medium, each integration component configured for integration with a respective data source and/or data source type (e.g., each configured to access, interpret, extract, and/or incorporate RTS data 505 in accordance with a respective access protocol and/or configuration).

In some examples, the acquisition engine 533 may be configured to monitor one or more data sources (e.g., one or more of the transaction data sources 503A-N). The monitoring may comprise accessing respective transaction data sources 503A-N (querying and/or retrieving data records therefrom), interpreting the accessed data (identifying data pertaining to user transactions), extracting RTS data 505 pertaining to the user transactions, and/or importing the RTS data 505 into the service provider platform 531, in some examples. The acquisition engine 533 may be configured to monitor one or more of the transaction data sources 503A-M periodically (e.g., once every T seconds, minutes, hours, or days). Alternatively, or in addition, the acquisition engine 533 may be configured to monitor the transaction data sources 503A-M continuously and/or in response to update requests (e.g., requests from the user 501). In some examples, the acquisition engine 533 may be configured to receive RTS data 505 "pushed" from one or more data sources. The acquisition engine 533 may be configured to subscribe to receive updates published by one or more transaction data sources 503A-N, which may be configured to push data updates to subscribers in response as such updates are made available. The acquisition engine 533 may be configured to selectively incorporate RTS data 505 acquired in response to the monitoring, in some examples.

The acquisition engine 533 may be configured to maintain transaction records 525, the transaction records 525 configured to represent respective transactions involving the user 501. The transaction records 525 may comprise a uniform representation of transactions involving a plurality of different vendors and/or a plurality of different carriers (e.g., may comprise a target configuration to which native data pertaining to such transactions may be transformed). In some examples, the acquisition engine 533 may assign one or more identifiers to respective transaction records 525. The identifier(s) of a transaction record 525 may comprise a VTI (e.g., an identifier assigned to the transaction by the vendor, such as an order number, invoice number, and/or the like). Respective vendors may reference transactions using the VTI assigned thereby and, as such, may include the VTI of respective transactions in messages and/or other information pertaining to the respective transactions (e.g., may include the VTI in messages sent to the user regarding respective transactions and/or transaction shipments). The RTS data 505 extracted from respective transaction data sources 503A-N may, therefore, comprise transaction data identified by use of vendor-specific VTI, which may not be unique across different vendors. In some examples, the acquisition engine 533 may be configured to form unique transaction identifiers from vendor-specific information extracted from respective transaction data sources 503. The acquisition engine 533 may be configured to generate a transaction identifier by, inter alia, combining a vendor-specific VTI with another identifier (e.g., an identifier assigned to the corresponding vendor). Although particular examples for uniquely identifying transactions (and/or generating unique transaction identifiers) are described herein, the disclosure is not limited in this regard and could be adapted to utilize any suitable scheme for identifying and/or naming respective transactions and/or transaction records 525.

In some examples, importing RTS data 505 pertaining to a transaction may comprise generating a new transaction record 525 to represent the transaction and/or updating an existing transaction record 525 corresponding to the transaction. In response to receiving RTS data 505, the acquisition engine 533 may determine whether the RTS data 505 pertains a transaction associated with an existing transaction record 525. If the RTS data 505 corresponds to an existing transaction record 525, the acquisition engine 533 may be configured to incorporate the RTS data 505 therein (e.g., update the existing transaction record 525 to include portion(s) of the RTS data 505). If the RTS data 505 does not correspond to an existing transaction record 525, the acquisition engine 533 may incorporate the RTS data 505 into a new transaction record 525. The acquisition engine 533 may determine whether the RTS data 505 corresponds to an existing transaction record 525 by, inter alia, comparing one or more identifiers of the RTS data 505 to identifiers of one or more existing transaction records 525 (e.g., a transaction identifier derived from vendor-specific VTI, in some examples). By way of non-limiting example, the acquisition engine 533 may extract first RTS data 505 from a transaction data source 503 (e.g., from an "order confirmation" email message sent from a particular vendor). The "order confirmation" email message (and first RTS data 505 extracted therefrom) may reference the transaction by use of a vendor-specific VTI, which may comprise an identifier assigned to the transaction by the particular vendor. The acquisition engine 533 may import the first RTS data 505, which may comprise generating a first transaction record 525. The importing may comprise determining a unique identifier for the transactions that incorporates the vendor-specific VTI (e.g., is a combination of the VTI and identifier of the particular vendor). After generating the first transaction record 525, the acquisition engine 533 may acquire second RTS data 505 (e.g., from a "shipping confirmation" email message sent a number of days after the initial "order confirmation" email message). The "shipping confirmation" email message (and the second RTS data 505 extracted therefrom) may reference the vendor-specific VTI assigned by the particular vendor. The acquisition engine 533 may import the second RTS data 505 into the service provider platform 531, which may comprise associating the second RTS data 505 with a unique transaction identifier (e.g., by combining the vendor-specific VTI with the identifier of the particular vendor), and may use the unique transaction identifier to determine that the second RTS data 505 pertains to an existing transaction record 525 (the first transaction record 525). The second RTS data 505 may, therefore, be imported into the first transaction record 525.

In some examples, the acquisition engine 533 may be configured to acquire, maintain, and/or update transaction records 525 pertaining to respective transactions involving the user 501 by, inter alia, extracting RTS data 505 from one or more transaction data sources 503A-N (in accordance with access data 515 of the user 501), and importing the data into the service provider platform 531, which may comprise incorporating the RTS data 505 into one or more transaction records 525, each transaction record 525 configured to represent a respective transaction involving the user 501. A transaction may involve one or more shipments (transaction shipments). The RTS data 505 pertaining to a transaction may comprise information pertaining to respective transaction shipments (e.g., shipment identifiers). The acquisition engine 533 may maintain information pertaining to respective transaction shipments in respective transaction records 525. The acquisition engine 533 may extract RTS data 505 comprising carrier and/or shipment identifiers of respective transaction shipments from one or more transaction data sources 503A-N, and may incorporate the RTS data 505 into the service provider platform 531, in some examples. In some examples, the acquisition engine 533 may maintain information pertaining to the shipments associated with a transaction within the transaction record 525 corresponding to the transaction (or in separate transaction shipment records that reference and/or are linked to the corresponding transaction record 525). The acquisition engine 533 may be configured to maintain any suitable information pertaining to respective transaction shipments including, but not limited to: an identifier of the carriers assigned to handle respective transaction shipments (e.g., carrier name, identifier, URI, URL, and/or the like), shipment identifiers assigned to the respective transaction shipments (e.g., carrier-specific identifiers such as tracking numbers, confirmation numbers, delivery confirmation numbers, and/or the like), and so on.

The acquisition engine 533 may be further configured to obtain status information pertaining to respective transaction shipments from one or more shipment data sources 507. As used herein, a shipment data source 507 refers to any network-accessible system, platform, and/or service configured to store, maintain, and/or provide access to shipment status data. A shipment data source 507 may comprise shipment status pertaining to a designated carrier and may be configured to provide current status data pertaining to shipments handled by the designated carrier (in reference to shipment identifiers assigned to the shipments by the carrier). Alternatively, or in addition, a shipment data source 507 may be configured to maintain status data pertaining to particular types of shipments, such as overnight shipments, international shipments, and/or the like. A shipment data source 507 may correspond to a specified type and/or range of shipment identifiers (e.g., shipment identifiers, carrier identifiers, tracking numbers, confirmation numbers, and/or the like). In some examples, one or more data sources (e.g., first data source) in a service provider network may be included in the shipment data source 507. In some examples, one or more data sources (e.g., second data source) outside of a service provider network may be included in the shipment data source 507.

The acquisition engine 533 may be configured to obtain RTS data 505 comprising shipment status information from a plurality of different shipment data sources 507 (e.g., shipment data sources 507A-N). The acquisition engine 533 may obtain and/or update status information of a transaction shipment associated with a transaction record 525 by, inter alia, sending a request to a selected shipment data source 507 (the shipment data source 507 selected in accordance with the carrier identifier and/or shipment identifier of the transaction shipment), receiving response data from the shipment data source 507, extracting RTS data 505 from the response data, and importing the RTS data 505 into the service provider platform 531, in some examples. The acquisition engine 533 may be configured to request shipment status data in accordance with any suitable protocol (e.g., in accordance with a network access protocol and/or API supported by the shipment data source 507). The acquisition engine 533 may be further configured to access, interpret, analyze, parse, extract and/or import RTS data 505 comprising shipment status information in accordance with any suitable configuration (e.g., any suitable layout, structure, schema, encoding, data representation, namespace, and/or the like). In some examples, the acquisition engine 533 may be configured to transform response data returned from respective shipment data sources 507 A-N, in some examples (e.g., transform shipment status information from a native configuration of the respective shipment data sources 507 A-N to a target configuration corresponding to the transaction records 525 maintained by the acquisition engine 533). The acquisition engine 533 may be configured to obtain and/or incorporate any suitable information pertaining to transaction shipments including, but not limited to: shipment status (e.g., whether the shipment is in transit, has been delivered, is on-time, is delayed, and/or the like), current physical location, estimated time of arrival (ETA), shipment exceptions (e.g., shipment routing and/or delivery exceptions), damage reports, and/or the like.

In some examples, the acquisition engine 533 is configured to monitor one or more of the shipment data sources 507 A-N. The acquisition engine 533 may be configured to periodically retrieve status information pertaining to selected transaction shipments and/or transaction shipments associated with selected transaction records 525 (e.g., once every T seconds, minutes, hours, and/or days). Alternatively, or in addition, the acquisition engine 533 may be configured to monitor the shipment data sources 507 A-N continuously and/or in response to update requests (e.g., requests from the user 501). In some examples, the acquisition engine 533 may be configured to subscribe to shipment updates published by one or more shipment data sources 507 A-N, in some examples. The acquisition engine 533 may be configured to receive shipment status information published by one or more shipment data sources 507 A-N as such updates to such shipment status information are made available.

Although FIG. 5 shows the acquisition engine 533 extracting RTS data 505 from separate data sources (e.g., separate transaction data sources 503, shipment data sources 507, vendors, and/or the like), the disclosure is not limited in this regard. In some examples, the acquisition engine 533 may be configured to obtain RTS data 505 from systems, platforms, and/or services configured to provide access to both transaction and shipment status information. The acquisition engine 533 may be configured to retrieve RTS data 505 comprising transaction and/or shipment status information from an ecommerce system, the ecommerce system configured to provide information pertaining to user transactions as well as shipment status information pertaining to shipments associated with the user transactions.

The acquisition engine 533 may be configured to update status information pertaining to respective transactions and/or transaction shipments in accordance with RTS data 505 acquired thereby. The acquisition engine 533 may be configured to mark transaction shipments as complete in response to retrieving shipment status data indicating that the transaction shipment has been delivered (and/or has been accepted by the user 501). The acquisition engine 533 may be further configured to mark transaction records 525 as complete in response to determining that each transaction shipment thereof is complete (and/or in response to transaction data indicating completion of the transaction from the user 501, the vendor, a transaction data source 503, and/or the like).

The acquisition engine 533 may be further configured to generate and/or maintain transaction datasets 553 for respective users 501. Maintaining a transaction dataset 553 for a user may comprise maintaining and/or updating transaction records 525 pertaining to transactions involving the user 501. The transaction dataset 553 for user 501 may comprise transaction records 525 pertaining to active transactions involving the user 501. As used herein, an "active" transaction record 525 refers to a transaction record 525 pertaining to a transaction that has not been completed (and/or has not been marked as complete). In some examples, the acquisition engine 533 may determine the status of respective transaction records 525 based on RTS data 505 pertaining to the transaction retrieved from one or more data sources, the user 501, vendor, and/or the like. A transaction between a user 501 and a vendor may be completed when obligations of the user 501 and/or vendor pursuant to the transaction have all been satisfied (e.g., the user 501 has made required payment(s), and items purchased from the vendor have been delivered and/or accepted by the user 501).

The transaction dataset 553 of a user 501 may comprise a plurality of transaction records 525, the transaction records 525 comprising information pertaining to transactions with a plurality of different vendors and/or transaction shipments being handled by a plurality of different carriers. The acquisition engine 533 may extract RTS data 505 comprising the transaction records 525 from a plurality of different data sources in accordance with a plurality of different data access protocols and/or mechanisms, each data source having a different respective configuration. Accordingly, maintaining the transaction records 525 (and/or transaction dataset 553) may further comprise transforming RTS data 505 extracted from the plurality of data sources in accordance with a plurality of different native configurations to a unified, target configuration (e.g., uniform transaction records 525). Maintaining the transaction records 525 and/or transaction dataset 553 may, therefore, comprise aggregating and/or combining RTS data 505 that spans a plurality of different vendors, a plurality of different carriers, a plurality of different data sources, a plurality of different data access protocols, and/or a plurality of different configurations (e.g., a plurality of different data layouts, structures, formats, schemas, encodings, representations, namespaces, and/or the like).

Maintaining the transaction dataset 553 of the user 501 may comprise monitoring one or more data sources, retrieving RTS data 505 in response to the monitoring, and updating the transaction dataset 553 in accordance with the retrieved RTS data 505, in some examples. The monitoring may comprise adding new transaction records 525 to the transaction dataset 553 (in response to retrieving RTS data 505 pertaining to new transactions involving the user 501 from one or more transaction data sources 503A-N), updating existing transaction records 525 in response to retrieving RTS data 505 from one or more transaction data sources 503A-N, updating existing transaction records 525 in response to accessing RTS data 505 comprising shipment status information from one or more shipment data sources 507 A-N, and so on. The monitoring may comprise marking one or more transaction shipments as complete and/or delivered (e.g., in response to importing shipment status data indicating delivery of the shipment and/or acceptance of the shipment by the user 501). The monitoring may further comprise marking one or more transaction records 525 as complete (e.g., in response to transaction data indicating that the transaction is complete and/or shipment status data indicating that each transaction shipment thereof has been delivered and/or accepted). The monitoring may, therefore, comprise adding transaction records 525 representing new transactions involving the user 501 to the transaction dataset 553 and/or removing existing transaction records 525 representing completed transactions from the transaction dataset 553.

The interface engine 535 may be configured to provide interface(s) (e.g., one or more pages described herein) for managing and/or visualizing transactions involving respective users 501. The interface engine 535 may be configured to power, implement, generate, and/or display an aggregated transaction and shipment interface (ATS interface 555), which may be configured to graphically display information pertaining to the transaction dataset 553 of a user 501. The ATS interface 555 may be configured to display information pertaining to a plurality of transactions involving the user 501 within a single, unified graphical user interface (GUI). The ATS interface 555 may be configured to graphically display information pertaining to a plurality of shipments, the shipments handled by a plurality of different carriers and comprising items purchased in transactions with a plurality of different vendors. In some examples, the interface engine 535 may be configured to implement the ATS interface 555 in conjunction with an application operating on a client computing device 649 (e.g., application 657). In some examples, the interface engine 535 may be configured to produce a personalized feed in conjunction with an application operating on a client computing device 649 (e.g., application 657).

The ATS interface 555 may be configured to display a transaction dataset 553 on a computing device display, such as a display of a client computing device 649. The client computing device 649 may comprise any device having processing, memory, storage, display, and/or communication resources capable of receiving and/or rendering the ATS interface 555, including, but not limited to: a personal computing device, a workstation, a mobile computing device, a laptop, a notebook, a netbook, a communication device, a smart phone, a smart watch, a personal digital assistant (PDA), and/or the like. The ATS interface 555 (and/or other interface(s)) may comprise any suitable type of human-machine-interface (HMI) and/or any suitable HMI components. The ATS interface 555 may comprise a GUI configured for display at the client computing device 649. The ATS interface 555 may be embodied as computer-readable instructions stored on a non-transitory storage medium (e.g., the ATS interface 555 may be implemented by an application configured for operation on the client computing device 649 and embodied by instructions configured for execution on a processor thereof). Alternatively, or in addition, the ATS interface 555 may be rendered remotely (e.g., at the service provider platform 531) and/or embodied as markup data configured for rendering by an application operating on the client computing device 649 (e.g., a browser application).

Figure 6A:
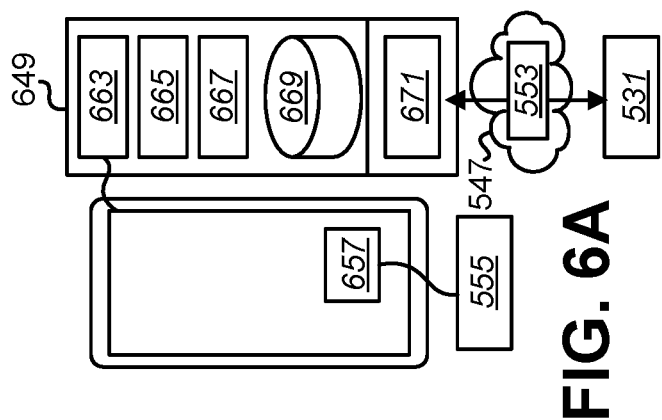
FIG. 6A depicts an example of a client computing device.

The ATS interface 555 may be configured for display on a client computing device 649. As illustrated in FIG. 6A, the client computing device 649 may comprise a portable computing device, such as a smart phone, PDA, and/or the like. The disclosure is not limited in this regard, however, and could be adapted for use with any suitable type of client computing device 649. The client computing device 649 may comprise a display 663, a processor 665 (e.g., a general-purpose processor, application-specific processor, central processing unit, and/or the like), memory 667 (e.g., volatile memory, non-volatile memory, persistent memory, random access memory (RAM), dynamic RAM, static RAM, and/or the like), non-transitory storage 669 (non-volatile storage, persistent storage, solid-state storage, and/or the like), a communication interface 671, and/or the like. In some examples, the ATS interface 555 may be embodied as markup data transmitted to the client computing device 649 through the network 547 (via the communication interface 671).

In the FIG. 6A example, the ATS interface 555 may be embodied as an application 657 configured for operation on the client computing device 649. The application 657 may be embodied as instructions stored on non-transitory storage 669 of the client computing device 649, the instructions configured to cause the computing device 649 to display the ATS interface 555 on the display 663 (and/or implement another operation(s)). The application 657 may be configured to display the ATS interface 555 in response to being launched (e.g., in response to the user 501 instantiating the application 657 through an operating system and/or launcher operating on the client computing device 649). The ATS interface 555 may be the first interface displayed by the application 657 (e.g., may comprise an initial interface of the application 657). In some examples, the personalized feed described herein may be produced as a part of the ATS interface 555. For instance, the personalized feed may be a tab, page, section, and/or window, etc., of the ATS interface 555. The personalized feed may be displayed on the display 663.

Figure 6B:
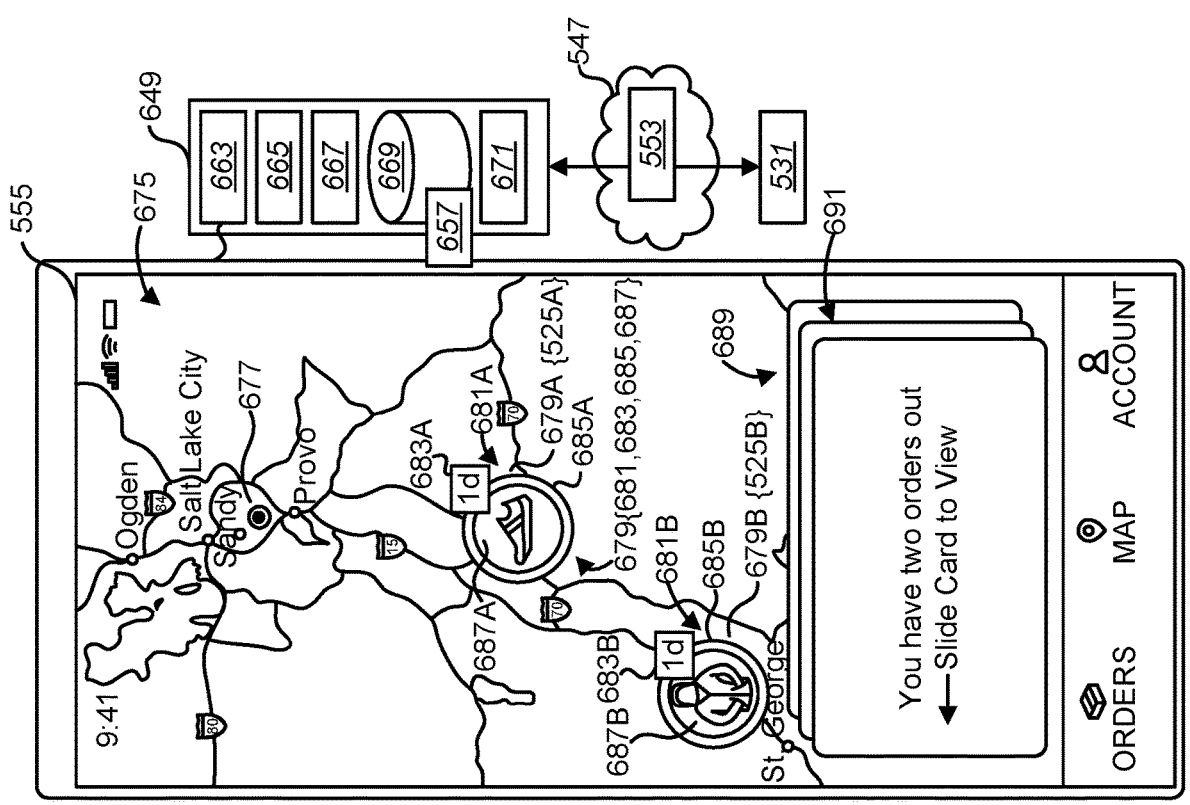
FIG. 6B depicts one example of an ATS interface.

FIG. 6B depicts one example of an ATS interface 555. The ATS interface 555 may be configured for display on a client computing device 649 (a portable computing device). The ATS interface 555 may be implemented by an application 657, which may be embodied as instructions stored on non-transitory storage 669 of the client computing device 649, the instructions configured to cause the computing device 649 to display the ATS interface 555 on the display 663 (and/or implement another operation(s)). The application 657 may be configured to display the ATS interface 555 when launched (the ATS interface 555 may be a first GUI interface presented by the application 657). In some examples, the ATS interface 555 may include a personalized feed as another GUI (e.g., second GUI).

In some examples, the ATS interface 555 may be configured to graphically display information pertaining to a transaction dataset 553 of a user 501. Displaying the ATS interface 555 may comprise accessing and/or receiving a transaction dataset 553 for the user 501 (and/or selected portions thereof). Displaying the ATS interface 555 may comprise accessing the transaction dataset 553 cached on the client computing device 649. Alternatively, or in addition, displaying the ATS interface 555 may comprise retrieving the transaction dataset 553 from the service provider platform 531 (via the network 547, by use of the communication interface 671 of the client computing device 649). In some examples, portions of the ATS interface 555 (e.g., markup data and/or computer-readable instructions thereof) may be received from the service provider platform 531 through the network 547.

The ATS interface 555 may comprise a map component 675, which may be configured to display a graphical representation of a selected geographical area. A center of the selected geographical area may correspond to a delivery location associated with the transaction dataset 553. The delivery location may be represented by a delivery indicator 677 displayed on the map component 675. The delivery indicator 677 may correspond to a delivery address of the user 501 (e.g., the destination address for shipments of the transaction dataset 553). In some examples, the geographical area covered by the map component 675 may correspond to, inter alia, the transaction dataset 553 being displayed by the ATS interface 555 (e.g., physical locations of respective transaction shipments of the transaction dataset 553 and/or the delivery location thereof).

The ATS interface 555 may be configured to graphically represent shipments corresponding to each transaction record 525 of the transaction dataset 553. In the FIG. 6B example, the ATS interface 555 may comprise one or more transaction shipment GUI components (TSG components 679), each TSG component 679 configured to represent a respective transaction shipment (e.g., a shipment associated with a specified transaction record 525, and/or transaction shipment thereof). The TSG components 679 may comprise GUI elements configured to graphically represent information pertaining to respective shipments, including, but not limited to: a current physical location of the shipment, an ETA of the shipment, a status of the shipment, items included in the shipment, and/or the like. The application 657 and/or ATS interface 555 may be configured to place TSG components 679 at selected locations within the map component 675 (map locations 681), which may be selected in accordance with the current physical location(s) of the shipments represented thereby. The map location 681 of a TSG component 679 may, therefore, indicate a current physical location of the shipment as reported by the shipment carrier and/or shipment data source 507 (as obtained by the acquisition engine 533). A TSG component 679 may further comprise one or more of: an ETA element 683

(configured to display the reported ETA of the shipment), a shipment status element 685 (comprising a graphical representation of a status of the shipment), a logo display element 687 (configured to represent a brand and/or items included in the shipment), and/or the like. The shipment status element 685 may indicate a status of a shipment by use of a color, size, and/or intensity of the GUI element (e.g., a ring or other visual element). The ATS interface 555 may use light blue or green shipment status elements 685 to represent nominal shipments (shipments that are on-time, have no exceptions, have no reported damage, and/or the like), and may use bright red or orange shipment status elements 685 to represent shipments subject to exceptions (e.g., shipments that have been delayed, misrouted, have reported damage, and/or the like). The logo display element 687 may comprise a visual representation of the contents of a shipment (e.g., a picture or other visual representation of a brand of one or more items included in the shipment).

In the FIG. 6B example, the ATS interface 555 may comprise a plurality of TSG components 679, including a first TSG component 679A and a second TSG component 679B. The first TSG component 679A may be configured to represent a first shipment and the second TSG component 679B may be configured to represent a second shipment. The first shipment may pertain to a first transaction (a first transaction record 525A), may comprise items purchased from a first vendor, and may be handled by a first carrier. The second TSG component 679B may pertain to a second transaction (a second transaction record 525B), may comprise items purchased from a second vendor, and may be handled by a second carrier. The ATS interface 555 illustrated in FIG. 6A may, therefore, graphically depict transactions corresponding to a plurality of different vendors having corresponding shipments handled by a plurality of different carriers. The map location 681A of the first TSG component 679A within the map component 675 may correspond to a physical location of the first shipment (as indicated by the first transaction record 525A), and the map location 681B of the second TSG component 679B may correspond to a physical location of the second shipment (as indicated by the second transaction record 525B). The ETA of the first and second shipments may be one day (as indicated by ETA elements 683A and 683B, respectively). The shipment status element 685A of the first TSG component 679A may visually indicate that the status of the first shipment is nominal. The shipment status element 685B of the second TSG component 679B may indicate that the status of the second shipment is non-nominal (that shipping exceptions have occurred). The logo display element 687A may indicate that the first shipment comprises a brand of running shoes and the logo display element 687B may indicate that the second shipment comprises a hooded sweatshirt brand.

In some examples, the ATS interface 555 may select the geographical area covered by the map component 675 (e.g., adjust the scale and/or position of the map component 675) based on, inter alia, physical locations of shipments included in the transaction dataset 553 and/or the destination location of the shipments. The ATS interface 555 may adjust the scale of the map component 675 such that the geographical area covered thereby includes the current physical location of each shipment. Alternatively, or in addition, the ATS interface 555 may be configured to provide for manual adjustment of the scale of the map component 675, the geographical area covered by the map component 675, and/or the like.

The ATS interface 555 may further comprise a transaction control 689. The transaction control 689 may provide for selection of respective transactions (and/or transaction shipments) of the transaction dataset 553 being displayed within the ATS interface 555. In the FIG. 6B example, the transaction control 689 may indicate a number of transactions being displayed in the ATS interface 555 (e.g., indicate that the transaction dataset 553 comprises 2 active transactions). In some examples, the transaction control 689 may provide for accessing information pertaining to selected transactions. The transaction control 689 may comprise a card interface comprising a plurality of card elements 691, each card element 691 corresponding to a respective transaction record 525. The transaction control 689 may provide for user selection of respective transactions in response slide and/or swipe inputs. In some examples, the transaction control 689 may be unselected (may not select any particular transaction record 525, as illustrated in the FIG. 6B example). Alternatively, the transaction control 689 may be configured to designate an initially selected transaction record 525 (e.g., a most recent transaction, an oldest transaction, a transaction having exceptions, and/or the like).

In some examples, the interface 555 may further comprise an update control (not shown in FIG. 6B to avoid obscuring details of the illustrated examples). The update control may be configured to receive update inputs from the user 501. In response to an update input, the application 657 may transmit an update directive to the service provider platform 531 and, in response to the update directive, the service provider platform 531 may instruct the acquisition engine 533 to retrieve updated RTS data 505 pertaining to transactions involving the user 501 (and/or respective transaction shipments), in some examples. In some examples, the update control may be configured to receive selective update inputs, which may correspond to specified transactions and/or transaction shipments (e.g., the update control may provide for selecting and/or may be displayed on a card element 691 corresponding to a particular transaction record 525 and/or a TSG component 679 corresponding to a particular transaction shipment). In response to a selective update input, the application 657 may transmit a selected update directive to the service provider platform 531 (specifying a selected transaction record 525 and/or transaction shipment) and, in response, the service provider platform 531 may instruct the acquisition engine 533 to attempt to retrieve updated RTS data 505 pertaining to the selected transaction record 525 and/or transaction shipment, in some examples.

Figure 6C:
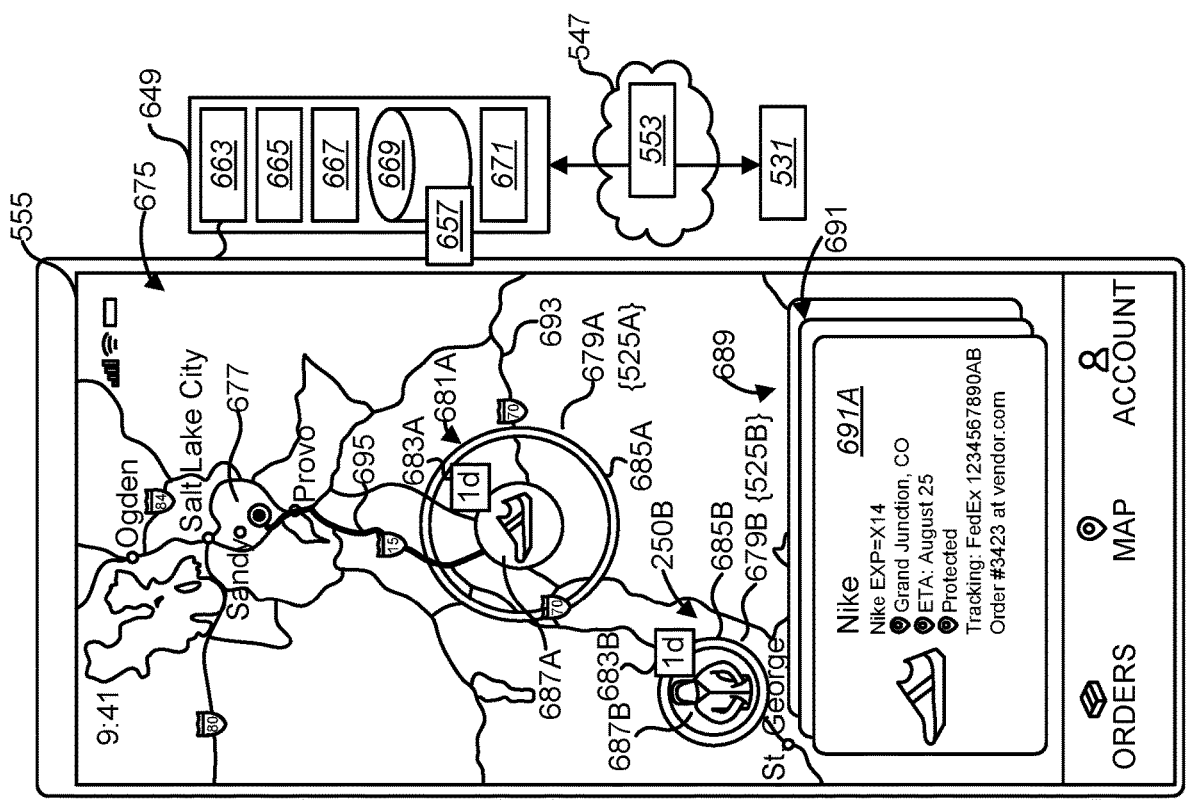
FIG. 6C depicts further examples of the disclosed ATS interface.

FIG. 6C depicts further examples of the disclosed ATS interface 555. In the FIG. 6C example, the transaction control 689 is configured to select transaction record 525A (and/or the shipment corresponding to TSG component 679A). The selection may correspond to user interaction with the transaction control 689 (e.g., in response to swipe and/or slide gesture inputs to the transaction control 689). In response to the selection, the transaction control 689 may be configured to display a card element 691A comprising information pertaining to the selected transaction record 525A. The card element 691A may indicate items purchased in the transaction (e.g., may comprise a graphical depiction of one or more of the items), identify the current physical location of the transaction shipment, display the estimated delivery date for the shipment, indicate whether the transaction and/or shipment is insured (e.g., protected), and so on. The card element 691A may further specify the source of tracking information for the transaction and/or shipment (e.g., specify the shipment identifier and/or provide a link to directly access tracking information maintained by the carrier). The card element 691A may be further configured to identify the vendor associated with the transaction (e.g., vendor.com), display the VTI of the transaction (e.g., order #3432), provide a link to the transaction at the vendor, and/or the like.

The application 657 (and/or ATS interface 555) may be further configured to modify one or more GUI elements and/or components of the ATS interface 555 in response to selection of the transaction record 525A. As illustrated in FIG. 6C the modifications may comprise highlighting the TSG component 679A corresponding to the selected transaction record 525A, which may comprise increasing a size of the TSG component 679A and/or respective GUI elements thereof (e.g., expanding the shipment status element 685A). The modifications may further comprise displaying visual representations of the tracking history of transaction shipments, such as visual representations of the path by which the shipment reached its current physical location (e.g., visual history representation 693 illustrated in FIG. 6C). The modifications may further comprise displaying visual representations of a projected path of the transaction shipments, such as visual representations of the path the shipment is projected to follow to reach the destination location (e.g., projected path representation 695 illustrated in FIG. 6C). Selection of the card element 691A and/or shipment component 679A may invoke an interface configured to display further details pertaining to the transaction.

Although particular examples of GUI components and/or elements are illustrated and described herein, the disclosure is not limited in this regard and could be adapted to incorporate any suitable GUI components and/or element configured to visually represent any suitable information pertaining to transactions and/or shipments, in some examples.

The application 657 may provide interfaces to enable users 501 to register with the service provider platform 531 (e.g., establish a user record 543 and access data 515, in some examples). After initial launch, the application 657 may determine whether the user 501 of the application 657 has registered with the service provider platform 531. If not, the application 657 may create an account (using an email address or other data, for example) and/or may prompt the user 501 to register, in some examples. In response to determining that the user 501 has registered with the service provider platform 531 (and has established access data 515 enabling the service provider platform 531 to obtain transaction data pertaining to transactions involving the user 501), the application 657 may initially invoke the ATS interface 555, in some examples.

Referring back to FIG. 5, the transaction records 525 maintained by the acquisition engine 533 may be configured to represent respective transactions involving the user 501, and may be embodied as electronically encoded data maintained on a non-transitory storage medium. In some examples, a transaction record 525 may comprise one or more of a:

| Field | Description |
| --- | --- |
| transaction identifier | Unique identifier of the transaction (e.g., combination of transaction identifier and vendor identifier). |
| user identifier | Identifier(s) of user(s) 501 associated with the transaction (may specify delivery location for transaction shipments). |
| vendor identifier | Identifier of the vendor associated with the transaction (name, URI, URL, etc.). |
| vendor transaction identifier | Identifier assigned to the transaction by the vendor (e.g., order number, invoice, and/or the like). |
| transaction items+ (items) | Information pertaining to item(s) purchased in the transaction. |
| transaction value (value) | Value of the transaction (total cost including tax, shipping, and/or the like). |
| transaction receipt+ | Information pertaining to satisfaction of the transaction by the buyer (user 501), such as payment methods and/or amounts. |
| Insurance | Information pertaining to insurance covering the transaction (if any). |
| Shipment records+ | Information pertaining to respective shipments associated with the transaction (transaction shipments). |
| transaction status | Indication of the status of the transaction (active, completed, disputed, etc.). |

As illustrated above, a transaction record 525 may comprise pertaining to one or more shipments (e.g., shipment records), which may be embodied as electronically encoded data maintained on a non-transitory storage medium. In some examples, a shipment record may comprise one or more of a:

| Field | Description |
| --- | --- |
| carrier identifier | Identifier of the carrier handling the shipment (name, URL, URI, etc.). |
| shipment identifier | Identifier assigned to the shipment by the carrier (e.g., tracking number). |
| shipment status | Status of the shipment (in transit, delivered, on-time, delayed, etc.). |
| shipment location | Current physical location of the shipment. |
| shipment exceptions | Information pertaining to shipment exceptions (e.g., delays, routing exceptions, etc.). |
| shipment damage | Information pertaining to reported damage to the shipment. |
| Destination | Location to which the shipment is being delivered. |
| Configuration | Information pertaining to access mechanism and/or configuration of shipment data accessible through shipment data source. |
| items+ | Items included in the shipment. |

Information pertaining to items included in respective transactions and/or shipments may be maintained in respective item records, which may be embodied as electronically encoded data maintained on a non-transitory storage medium and may include one or more of a:

| Field | Description |
| --- | --- |
| item identifier | Unique identifier of the item at a specified vendor (name, UPC, price, vendor identifier, etc.). |
| item options | Options pertaining to the item, such as color, size, and/or the like. |
| reorder information | Information to enable re-ordering of the item (e.g., a link to vendor, URI, URL, etc.). |

A transaction record 525 may be associated with a user 501 (as represented by corresponding user records 543). A user record 543 may be embodied as electronically encoded data maintained on a non-transitory storage medium and may include, but is not limited to a:

| Field | Description |
| --- | --- |
| user identifier | Unique identifier of the user 501 at the service provider platform 531 (and/or third-party identity service) |
| contact | Contact address(es) of the user (e.g., email address, instant messaging address, text messaging address, and/or the like). |
| access+ | Access data 515 configured to enable the acquisition engine 533 to obtain data pertaining to transactions of the user 501 from one or more transaction data sources 503. |
| active transactions+ | Identifier(s) of transaction records corresponding to active transactions involving the user 501. |
| recent transactions+ | Identifier(s) of transaction records corresponding to recently completed transactions involving the user 501. |
| saved transactions+ | Identifier(s) of transaction records corresponding to completed transactions saved by the user 501. |

Access data 515 may be embodied as electronically encoded data maintained on a non-transitory storage medium and may include, but is not limited to a:

| Field | Description |
| --- | --- |
| data source identifier | Unique identifier of the data source registration. |
| data source user identifier | Identifier of the user at the specified data source. |
| data source credential | Credential for use in authenticating to the specified data source. |
| data source protocol | Information pertaining to protocols by which data records may be accessed from the specified data source. |
| data source configuration | Information pertaining to the configuration of data maintained by specified data source. |

In some examples, the acquisition engine 533 may be configured to track the status of respective transactions (and/or transaction shipments). The acquisition engine 533 may be configured to monitor the status of respective transactions and/or transaction shipments. The acquisition engine 533 may maintain a transaction dataset 553 based on the monitoring.

In some examples, the service provider platform 531 may be further configured to maintain a recent transactions dataset comprising transaction records 525 corresponding to recently completed transactions involving the user 501. The transaction records 525 may be added to the recent transactions dataset in response to being marked as complete. Transaction records 525 may be removed from the recent transactions dataset after a pre-determined time (e.g., after T seconds, minutes, days, or weeks). The interface engine 535 may be configured to generate a GUI configured to display information pertaining to the recent transactions dataset (a recent transactions GUI). The recent transactions GUI may facilitate re-ordering one or more recently purchased items. The recent transactions GUI may further comprise means for retaining selected transaction records in a saved transactions dataset. Transactions recorded in the saved transactions dataset may be retained until explicitly deleted. The interface engine 535 may be configured to generate a GUI configured to display information pertaining to the saved transactions dataset (a saved transactions GUI). In some examples, the interface engine 535 may be utilized to identify one or more publisher domains as described herein and/or to produce a user interface to display a logo and/or products corresponding to the one or more publisher domains.

In some examples, the service provider platform 531 may further comprise and/or host a vendor-side transaction component (vendor component 573). The vendor component 573 may be configured to integrate into one or more transaction interfaces of the vendor (e.g., may be configured for integration into a checkout interface of the vendor). The vendor component 573 may be configured to accept user registration data during a checkout process at the vendor (e.g., may provide prompts to opt-in and/or register for transaction aggregation, management, and/or visualization services, in some examples). The vendor component 573 may comprise a check-box input requesting permission to share information pertaining to the user 501 maintained by the vendor with the service provider platform 531 (e.g., email, information pertaining to transactions between the user 501 and the vendor, and so on). Alternatively, or in addition, the vendor component 573 may comprise input components to prompt for and/or receive user registration information, in some examples (e.g., facilitate creation of a user record 543 and/or registration of access data 515, in some examples). In some examples, one or more data sources (e.g., first data source) in a service provider network may be included in the vendor component 573. In some examples, one or more data sources (e.g., second data source) outside of a service provider network may be included in the vendor component 573.

In some examples, the vendor component 573 may be further configured to present one or more offers pertaining to the transaction being established between the user 501 and the vendor (the vendor transaction). The vendor component 573 may determine a quote for insurance covering the vendor transaction. The vendor component 573 may determine the quote in accordance with information pertaining to the vendor transaction (e.g., information pertaining to items being purchased in the vendor transaction, the value of the items, the overall value of the vendor transaction, the destination of the items purchased in the vendor transaction, payment method(s) of the user 501, and/or the like). The vendor component 573 may capture information pertaining to the vendor transaction from one or more vendor interfaces (e.g., from one or more transaction interfaces of the vendor), may request transaction information from the vendor, may receive the transaction information from the vendor (e.g., the vendor may provide transaction information when instantiating the vendor component 573), and/or the like. The vendor component 573 may determine the insurance quote using any suitable mechanism including, but not limited to: applying one or more pre-determined rules or formula to derive the quote from the transaction information, sending a request for an insurance quote to the service provider platform 531, sending a request for an insurance quote to a third party (including portion(s) of the transaction information, in some examples), and/or the like. The vendor component 573 may be further configured to display the insurance quote and may comprise input components by which the user 501 may purchase insurance coverage in accordance with the quote. In some examples, the vendor component 573 may be configured to modify the transaction in response to acceptance of the insurance quote. The modifying may comprise instructing the vendor to include the cost of the insurance in the cost of the vendor transaction. Alternatively, the vendor component 573 provide for purchasing insurance coverage in a separate transaction independent of the vendor transaction. In response to the purchasing of insurance coverage, the vendor component 573 may transmit information pertaining to the purchased insurance to the service provider platform 531, which may record the insurance coverage information in transaction record(s) 525 (and/or transaction shipment records) configured to represent the transaction and/or corresponding shipments.

Figure 7:
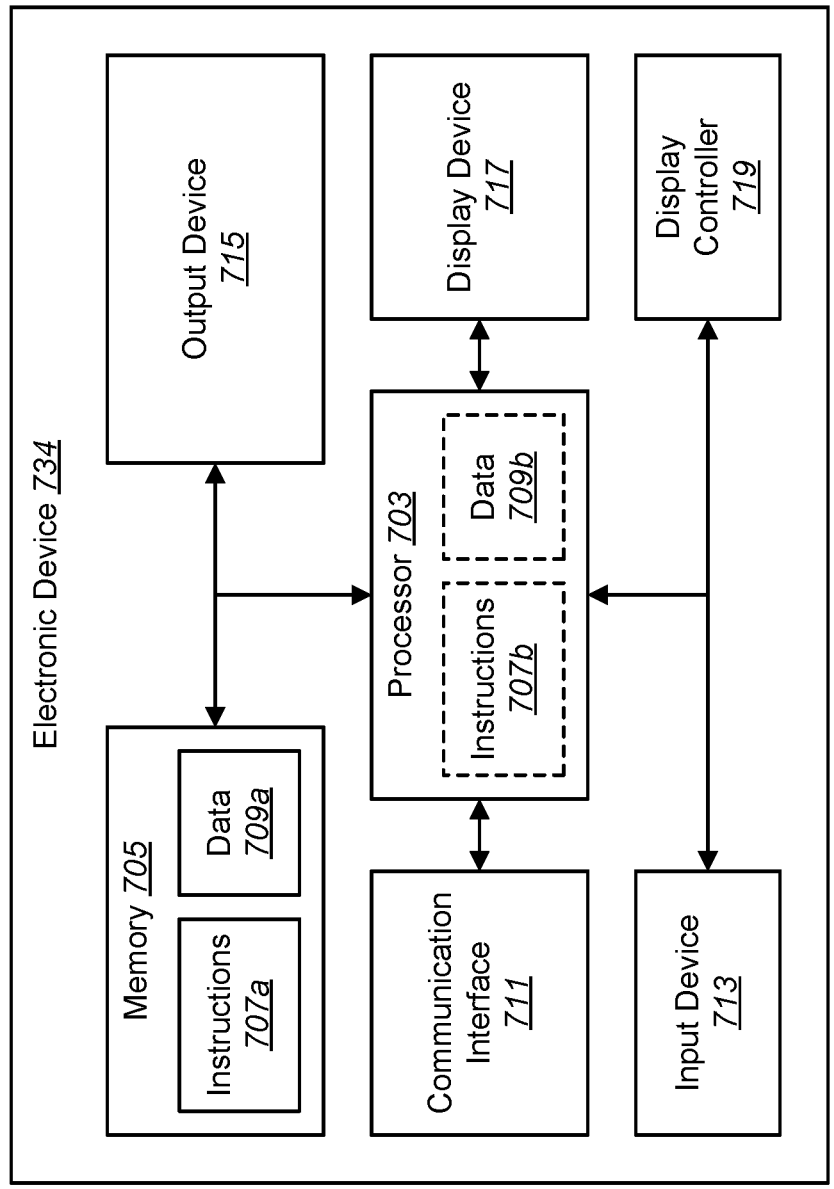
FIG. 7 illustrates various components that may be utilized in an electronic device.

FIG. 7 illustrates various components that may be utilized in an electronic device 734. The electronic device 734 may be configured in accordance with one or more of the computing devices (e.g., computing device 102, client computing device 136, client computing device 649, and/or or servers described herein.

The electronic device 734 may include a processor 703 and memory 705. The memory 705 may include instructions 707a and data 709a. The processor 703 controls the operation of the electronic device 734 and may be, for example, a microprocessor, a microcontroller, a digital signal processor (DSP), or other device. The processor 703 may perform logical and arithmetic operations based on program instructions 707b and/or data 709b received from the memory 705.

The electronic device 734 may include one or more communication interfaces 711 for communicating with other electronic devices. The communication interfaces 711 may be based on wired communication technology, wireless communication technology, or both. Examples of different types of communication interfaces 711 include a serial port, a parallel port, a Universal Serial Bus (USB), an Ethernet adapter, an Institute of Electrical and Electronics Engineers (IEEE) bus interface, a small computer system interface (SCSI) bus interface, an infrared (IR) communication port, a Bluetooth wireless communication adapter and so forth.

The electronic device 734 typically may include one or more input devices 713 and one or more output devices 715. Examples of different kinds of input devices 713 include a keyboard, mouse, microphone, remote control device, button, joystick, trackball, touchpad, lightpen, etc. Examples of different kinds of output devices 715 include a speaker, printer, etc. One specific type of output device 715 that may be included in a computer system is a display device 717. Display devices 717 used with configurations disclosed herein may utilize any suitable image projection technology, such as liquid crystal display (LCD), light-emitting diode (LED), gas plasma, electroluminescence, a cathode ray tube (CRT) or the like.

A display controller 719 may also be provided, for converting data 709a stored in the memory 705 into text, graphics and/or moving images (as appropriate) shown on the display device 717. Of course, FIG. 7 illustrates only one possible configuration of an electronic device 734. Various other architectures and components may be utilized.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The term "computer-readable medium" refers to any available non-transitory tangible medium that can be accessed by a computer or processor. By way of example, and not limitation, a computer-readable medium may comprise RAM, ROM, EEPROM, Compact Disc ROM (CD-ROM) or other optical disk storage, magnetic disk storage or other magnetic storage devices, removable flash drives or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described methods. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

As used herein, the term "and/or" may mean an item or items. For example, the phrase "A, B, and/or C" may mean any of: A (without B and C), B (without A and C), C (without A and B), A and B (but not C), B and C (but not A), A and C (but not B), or all of A, B, and C.

It is to be understood that the claims are not limited to the precise configuration and components illustrated above.

Various modifications, changes and variations may be made in the arrangement, operation and details of the systems, methods and apparatus described herein without departing from the scope of the claims.

What is claimed is:

1. A computing device, comprising:
a processor;
a memory; and
instructions stored in the memory, wherein when executed the instructions cause the processor to:
collect a set of uniform resource locators (URLs) from an email;
navigate to a final destination URL for each URL of the set of URLs to determine a set of final destination URLs, wherein navigating comprises following one or more redirects of a first URL of the set of URLs to navigate to a first final destination URL corresponding to the first URL, and wherein the set of final destination URLs includes the first final destination URL;
identify a single publisher domain based on the set of final destination URLs, wherein identifying the single publisher domain comprises generating a histogram of final destination domains from the set of final destination URLs and selecting a final destination domain with a greatest count from the histogram as the single publisher domain; and
determine a merchant based on the single publisher domain.

2. The computing device of claim 1, wherein the instructions, when executed, cause the processor to discard a URL that includes a prohibited domain name to produce the set of URLs.

3. The computing device of claim 2, wherein the prohibited domain name indicates an email service provider domain, a shipping provider domain, or a social media domain.

4. The computing device of claim 1, wherein the instructions, when executed, cause the processor to:
determine whether an originator domain name of the email matches an entry of a publisher index; and
collect the set of URLs in response to a determination that the originator domain name of the email does not match an entry of the publisher index.

5. The computing device of claim 1, wherein the one or more redirects includes a redirect from an activity tracking platform domain, from a software as a service (SaaS) platform domain, or from a security platform domain.

6. The computing device of claim 1, wherein the instructions, when executed, cause the processor to:
determine a merchant logo based on the single publisher domain; and
generate a shipment tracking page based on the merchant logo.

7. The computing device of claim 6, further comprising a communication interface configured to send the shipment tracking page to a client computing device.

8. A method, comprising:
collecting, by a processor, a set of uniform resource locators (URLs) from a email;
navigating, by the processor, to a final destination URL for each URL of the set of URLs to determine a set of final destination URLs, wherein navigating comprises following one or more redirects of a first URL of the set of URLs to navigate to a first final destination URL corresponding to the first URL, and wherein the set of final destination URLs includes the first final destination URL;
identifying, by the processor, a single publisher domain based on the set of final destination URLs, wherein identifying the single publisher domain comprises generating a histogram of final destination domains from the set of final destination URLs and selecting a final destination domain with a greatest count from the histogram as the single publisher domain; and
determining a merchant based on the single publisher domain.

9. The method of claim 8, further comprising discarding a URL that includes a prohibited domain to produce the set of URLs.

10. The method of claim 9, wherein the prohibited domain is an email service provider domain, a shipping provider domain, or a social media domain.

11. The method of claim 8, further comprising:
determining whether an originator domain name of the email matches an entry of a publisher index; and
collecting the set of URLs in response to a determination that the originator domain name of the email does not match an entry of the publisher index.

12. The method of claim 8, wherein the one or more redirects includes a redirect from a publisher tracker domain, from a software as a service (SaaS) provider tracker domain, or from a secure link domain.

13. A non-transitory tangible computer-readable medium comprising instructions when executed cause a processor to:
collect a set of uniform resource locators (URLs) from an email;
navigate to a final destination URL for each URL of the set of URLs to determine a set of final destination URLs, wherein navigating comprises following one or more redirects of a first URL of the set of URLs to navigate to a first final destination URL corresponding to the first URL, and wherein the set of final destination URLs includes the first final destination URL;
identify a single publisher domain based on the set of final destination URLs, wherein identifying the single publisher domain comprises generating a histogram of final destination domains from the set of final destination URLs and selecting a final destination domain with a greatest count from the histogram as the single publisher domain; and
determine a merchant based on the single publisher domain.

* * * * *